United States Patent
Kumar et al.

(10) Patent No.: US 11,326,004 B2
(45) Date of Patent: May 10, 2022

(54) ISOBUTYLENE COPOLYMERS, METHOD FOR MAKING ISOBUTYLENE COPOLYMERS AND ISOBUTYLENE COPOLYMER PRODUCTS

(71) Applicant: TPC Group LLC, Houston, TX (US)

(72) Inventors: Rajeev Kumar, Houston, TX (US); André M. Gobin, Pearland, TX (US); George Pappas, Galveston, TX (US); James A. Hopson, Humble, TX (US); Michael O. Nutt, Pearland, TX (US); Peggy J. Macatangay, League City, TX (US); Randall V. Redd, Spring, TX (US)

(73) Assignee: TPC GROUP LLC, Houston, TX (US)

( * ) Notice: Subject to any disclaimer, the term of this patent is extended or adjusted under 35 U.S.C. 154(b) by 0 days.

(21) Appl. No.: 16/648,488

(22) PCT Filed: Oct. 12, 2018

(86) PCT No.: PCT/US2018/055617
§ 371 (c)(1),
(2) Date: Mar. 18, 2020

(87) PCT Pub. No.: WO2019/075331
PCT Pub. Date: Apr. 18, 2019

(65) Prior Publication Data
US 2020/0231724 A1 Jul. 23, 2020

Related U.S. Application Data

(60) Provisional application No. 62/572,440, filed on Oct. 14, 2017.

(51) Int. Cl.
*C08F 210/10* (2006.01)
*C08F 2/01* (2006.01)
(Continued)

(52) U.S. Cl.
CPC ............ *C08F 210/10* (2013.01); *C08F 2/001* (2013.01); *C08F 2/01* (2013.01); *C08F 4/14* (2013.01);
(Continued)

(58) Field of Classification Search
USPC ........................................ 526/283, 308, 347
See application file for complete search history.

(56) References Cited

U.S. PATENT DOCUMENTS 3,288,735 A   11/1966  Watanabe et al.
3,438,804 A    4/1969  Berger
(Continued)

FOREIGN PATENT DOCUMENTS

EP    1013679 A1    6/2000
EP    1342739 A1    9/2003
(Continued)

OTHER PUBLICATIONS

Written Opinion of the International Preliminary Examining Authority dated Jan. 10, 2020.
(Continued)

*Primary Examiner* — Fred M Teskin
(74) *Attorney, Agent, or Firm* — Michael Ferrell

(57) ABSTRACT

Isobutylene copolymer includes repeat units derived from isobutylene and one or more comonomers selected from isoprene, butadiene, cyclopentadiene, dicyclopentadiene, limonene, substituted styrenes, and C4 to C10 dienes other than isoprene, butadiene, limonene, cyclopentadiene, or dicyclopentadiene, wherein the molar ratio of isobutylene derived repeat units to the comonomer derived repeat units is from 75:1 to 1.5:1. The copolymers have a molecular weight, Mn, of from 200 to 20,000 Daltons and typically have a high double bond content and a high vinylidene double bond content when diene monomers are utilized.

25 Claims, 5 Drawing Sheets

(51) Int. Cl.
    C08F 212/08    (2006.01)
    C08F 236/06    (2006.01)
    C08F 236/08    (2006.01)
    C08F 4/14      (2006.01)
    C08F 210/12    (2006.01)
    C08F 2/00      (2006.01)
(52) U.S. Cl.
    CPC .......... C08F 210/12 (2013.01); C08F 212/08
         (2013.01); C08F 236/06 (2013.01); C08F
                                  236/08 (2013.01)

(56) References Cited

U.S. PATENT DOCUMENTS

| | | | |
|---|---|---|---|
| 3,896,097 | A | 7/1975 | Priola et al. |
| 4,152,499 | A * | 5/1979 | Boerzel .................. C08F 10/10 525/381 |
| 4,207,142 | A | 6/1980 | Shepherd |
| 4,465,829 | A | 8/1984 | Graves |
| 4,698,411 | A | 10/1987 | Hill et al. |
| 5,124,484 | A | 6/1992 | Brown et al. |
| 5,556,932 | A | 9/1996 | Rath et al. |
| 5,663,457 | A | 9/1997 | Kolp |
| 5,677,405 | A | 10/1997 | Goodall et al. |
| 5,725,612 | A | 3/1998 | Malfer et al. |
| 6,274,689 | B1 * | 8/2001 | Shaffer ................. C08F 212/34 526/336 |
| 6,858,188 | B2 | 2/2005 | Baxter, Jr. et al. |
| 7,067,594 | B2 | 6/2006 | Kolp |
| 7,241,831 | B2 | 7/2007 | Waddell et al. |
| 7,291,758 | B2 | 11/2007 | Bohnenpoll et al. |
| 7,388,033 | B2 | 6/2008 | Nagy et al. |
| 7,750,089 | B2 | 7/2010 | Kolp et al. |
| 8,710,147 | B2 | 4/2014 | Cherpeck et al. |
| 8,791,216 | B2 | 7/2014 | Baxter, Jr. |
| 8,816,028 | B2 | 8/2014 | Baxter, Jr. |
| 9,752,020 | B2 | 9/2017 | Wang et al. |
| 2005/0043440 | A1 | 2/2005 | Resendes et al. |
| 2007/0068070 | A1 | 3/2007 | Jackson et al. |
| 2007/0142621 | A1 | 6/2007 | Reif et al. |
| 2012/0000118 | A1 | 1/2012 | Lange et al. |

FOREIGN PATENT DOCUMENTS

| | | |
|---|---|---|
| JP | 2011080084 A | 4/2011 |
| JP | 5027379 B2 | 9/2012 |
| KR | 19990021903 A | 3/1999 |
| WO | 2002004530 A2 | 1/2002 |
| WO | 2004058825 A2 | 7/2004 |
| WO | 2013062759 A1 | 5/2013 |
| WO | 2017151341 A1 | 9/2017 |

OTHER PUBLICATIONS

Abbate, M. et al., Journal of Applied Polymer Science, 1995, vol. 58, pp. 1825-1837.
White, J.L. et al., Incorporation of Isoprene in Isobutylene/Isoprene Copolymers: NMR Identification of Branching in Butyl Rubber, Macromolecules 1995, 28, 3290-3300.
Chu, C.Y. et al., Determination of the Structure of Butyl Rubber by NMR Spectroscopy, Macromolecules 1985, 18, 1423-1430.
Barsan, F. et al., Polymerization of Isobutylene and the Copolymerization of Isobutylene and Isoprene Initiated by the Metallocene Derivative Cp*TiMe2(μ-Me)B(C6F5)3, Macromolecules, vol. 31, No. 24, Dec. 1, 1998.
Tse, C.K.W., Isobutylene Polymerization and Isobutylene-Isoprene Copolymerization Using Cp*TiMe3/B(C6F5)3/Octadecanoic Acid Initiating System, (Thesis) Queens University Kingston Ontario, Sep. 2001.
Journal of Macromolecular Science, Part A: Pure and Applied Chemistry, 32:11, 1809-1830 (1995.
Polyfunctional PIB Succinimide Type Engine Oil Additives, L. Bartha et al., Lubrication Science, Aug. 2001, pp. 313-328.
Pandit, R. et al., Epoxidation of Styrene/Butadiene Star Block Copolymer by Different Methods and Characterization of the Blends with Epoxy Resin, Macromol. Symp. 2014, 341, pp. 67-74 (Wiley, 2014).
ASA Optimisation—Control of Particle Size, Stability and Hydrolysis, Martorana et al., University of Applied Sciences—München, Department of Paper Technology, Germany, Professional Papermaking 5 (2), pp. 34-42 (2008).
Bharat Dholakiya (2012). Unsaturated Polyester Resin for Specialty Applications, Polyester, Dr. Hosam El-Din Saleh (Ed.), InTech, DOI: 10.5772/48479 as of Aug. 2, 2017 (Chapter 7).
Kirk Othmer Encyclopedia of Chemical Technology, vol. 18, pp. 575-586, (1982).
Magenau, Andrew Jackson David, "Polyisobutylene Chain End Transformations: Block Copolymer Synthesis and Click Chemistry Functionalizations" (2010). Dissertations.
Extended European Search Report dated Aug. 11, 2021.
Tripathy, Ranjan; Ojha, Umaprasana; Faust, Rudolf (2011); Polyisobutylene Modified Bisphenol A Diglycidyl Ether Based Epoxy Resins Possessing Improved Mechanical Properties; Macromolecules; American Chemical Society; 44 (17), 6800-6809.
Edgardo Rivera-Tirado; David J. Aaserud; Chrys Wesdemiotis (2012); Characterization of Polyisobutylene Succinic Anhydride Chemistries Using Mass Spectrometry; Journal of Applied Polymer Science; 124(4), 2682-2690.
Indian Examination Report in counterpart US application dated Sep. 1, 2021.

* cited by examiner

ISOBUTYLENE COPOLYMERS, METHOD FOR MAKING ISOBUTYLENE COPOLYMERS AND ISOBUTYLENE COPOLYMER PRODUCTS

CROSS REFERENCE TO RELATED APPLICATIONS

This application is based on International Application No. PCT/US18/55617, filed Oct. 12, 2018 which was based on U.S. Provisional Patent Application No. 62/572,440, filed Oct. 14, 2017. The priorities of the foregoing applications are hereby claimed and their disclosures incorporated herein by reference.

TECHNICAL FIELD

The present invention relates to isobutylene copolymers with other unsaturated comonomers such as isoprene, styrene and the like, methods of making the copolymers and end-uses thereof.

BACKGROUND

Isobutylene copolymers are known in the art. The materials are generally reported useful in preparing fuel and lubricating oil additives when derivatized with maleic anhydride and optionally amines.

There is disclosed in U.S. Pat. No. 5,556,932 (BASF) isobutylene/diene copolymers with at least 60% vinylidene groups. This reference relates to isobutylene/butadiene copolymers for the most part. Example 9, Col. 9, includes a reactant mixture of C5s including isoprene, pentadienes and cyclopentadienes. Conversions of the various diene monomers in Example 9 are not reported. Reaction is carried out in a loop reactor with the reactants in hexane solvent (1:1) at −10° C.

U.S. Pat. No. 7,291,758 (BASF) discloses a process for making isobutylene/isoprene copolymers with an $M_n$ of 2,000 or so in an autoclave. Conversions are quite low, particularly where isoprene concentrations exceed about 8%.

U.S. Pat. No. 7,750,089 (Lubrizol) discloses isobutylene/diene copolymers made with chloride catalysts which are derivatized with anhydrides/amines for fuel additives. Examples specify isoprene/isobutylene made in a 1 L continuous reactor at −30° C. See also, U.S. Pat. No. 7,067,594 (Lubrizol) which discloses carboxylated isobutylene/polyene polymers for lubricating oil additives wherein carboxylation is carried out with maleic anhydride. The copolymers of the '594 patent are made with aluminum trichloride catalyst.

It is apparent from the foregoing references that improved methodologies for manufacture of isobutylene copolymers are needed in order to provide for more efficient manufacture and more reactive isobutylene copolymers.

The copolymers of the present invention are useful in a variety of applications including fuel and lubricating oil additives, rubber compositions and products as well as applications not typically employing polyisobutylenes such as in unsaturated polyester resins, polyurethanes, adhesives, sizings, oxirane derivatives and so forth as is described hereinafter.

The copolymers of the present invention, which are typically chloride-free, can be tailored to the particular end use in terms of molecular weight and functionality to provide superior novel products which are more easily formulated and prepared than traditional products.

SUMMARY OF INVENTION

It has been found in accordance with the present invention that isobutylene copolymers with an increased double bond content or selective incorporation of comonomers can be prepared in high yield at low reactor residence times. Suitable reactor temperatures are above −30° C. Comonomers used with isobutylene include:

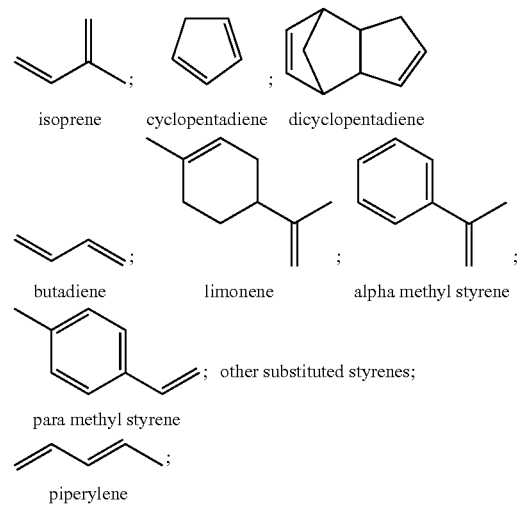

isoprene ; cyclopentadiene ; dicyclopentadiene butadiene ; limonene ; alpha methyl styrene para methyl styrene ; other substituted styrenes;

piperylene ;

and C4 to C10 dienes other than isoprene, cyclopentadiene, dicyclopentadiene, butadiene and piperylene, as well as like comonomers, such as α-terpenes and β-terpenes. The comonomers may be used in combination if so desired.

There is thus provided in accordance with the present invention a method of making an isobutylene copolymer comprising: (a) providing a reaction mixture to a reactor comprising isobutylene monomer, and one or more comonomers selected from isoprene, butadiene, cyclopentadiene, limonene, substituted styrenes, and C4 to C10 dienes other than isoprene, butadiene, limonene or cyclopentadiene as well as a Lewis acid polymerization catalyst, wherein the mole ratio of isobutylene to the comonomer is from 60:1 to 1:1; (b) polymerizing the reaction mixture while maintaining the reactor at a temperature above −30° C. and utilizing a reactor residence time of less than 45 minutes to produce a crude isobutylene copolymer in a polymerization mixture; and (c) recovering a purified isobutylene copolymer from the polymerization mixture having a molecular weight, Mn of from 200 to 20,000 Daltons; with the provisos that (i) when the comonomer is isoprene, butadiene or mixtures thereof, the reactor temperature is maintained at 0° C. or above and the purified isobutylene copolymer has a molecular weight, Mn, of from 200 to 2500 Daltons and (ii) when the comonomer comprises a substituted styrene the purified copolymer has a molecular weight, Mn, of from 200 to 5000 Daltons.

In another aspect of the invention there is provided an isobutylene copolymer comprising repeat units derived from isobutylene and repeat units derived from one or more comonomers selected from isoprene, cyclopentadiene, limonene, substituted styrenes, and C4 to C10 dienes other than isoprene, butadiene, limonene or cyclopentadiene, wherein the molar ratio of isobutylene derived repeat units to the comonomer derived repeat units is from 75:1 to 1.5:1 and the isobutylene copolymer has a molecular weight, Mn, of from 200 to 20,000 Daltons, with the provisos that (i) when the comonomer comprises a substituted styrene, the copolymer has a molecular weight, Mn, from 200 to 5000 Daltons and (ii) when the comonomer is isoprene, butadiene or mixtures thereof, the copolymer has a molecular weight, Mn, of from 200 to 2500 Daltons, at least 1.3 double bonds per molecule and greater than 0.8 vinylidene double bonds per molecule.

The copolymers of the present invention are useful in products such as fuel and lubricating oil additives as well as rubber compositions, adhesives, sizings, functionalized copolymers, unsaturated polyesters, polyurethanes, oxirane derivatives and so forth as described hereinafter. The copolymers described herein provide enhanced properties in such products, for example, better sizing properties based on multiple succinic anhydride groups per molecule allowing better integration into the paper product and superior sizing properties. Note FIG. 5, wherein it is seen that paper sizings made with the inventive copolymers exhibit relative water repellency more than 300% higher than conventional products.

Still further features and advantages of the invention will become apparent from the discussion which follows.

BRIEF DESCRIPTION OF DRAWINGS

The invention is described in detail below with reference to the various Figures, wherein.

DETAILED DESCRIPTION

Figure 1:
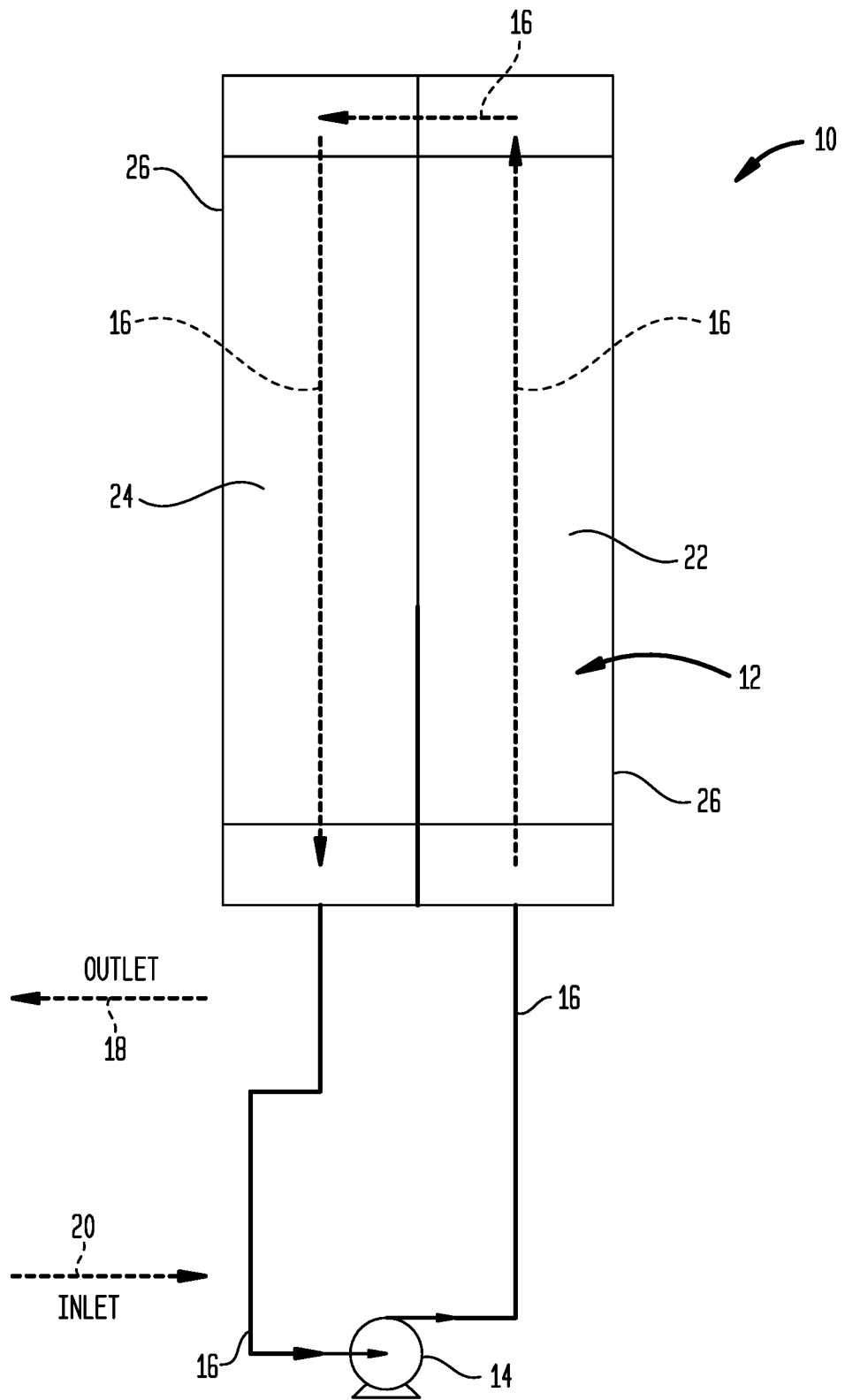
FIG. 1 is a schematic diagram illustrating a loop reactor apparatus suitable for use in connection with the present invention.

The invention is described in detail below with reference to several embodiments and numerous examples. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning, for example, psi refers to pressure in lbs/inch (psia indicates absolute pressure and psig indicates gauge pressure) and so forth. Terminology is further defined below and test methods are specified.

Absorptiveness of sized paper is measured using a modified Cobb test (TAPPI Test Method T-441 or equivalent) as described herein.

"Blending" and like terminology refers to intimate mixing of two or more feedstocks and includes simultaneously feeding two feedstocks to a reactor (in situ combination).

"Chloride free" and like terminology refers to compositions with less than 2 ppm chlorine content.

"Consisting essentially of" and like terminology refers to the recited components and excludes other ingredients which would substantially change the basic and novel characteristics of the mixture or composition. Unless otherwise indicated or readily apparent, a composition or mixture consists essentially of the recited components when the composition or mixture includes 95% or more by weight of the recited components. That is, the terminology excludes more than 5% unrecited components.

Conversion of the reaction mixture to polymer is expressed in percent and calculated as the weight (or moles) of monomer incorporated into the copolymer produced less the weight (or moles) of monomer fed to the reaction system divided by the weight (or moles) of monomer fed to the reaction system times 100. Conversion, selectivity and yield are related by the mathematical definition X(conversion)*S (selectivity)=Y(yield), all calculated on either a weight or molar basis; e.g. in a certain reaction, 90% of substance A is converted (consumed), but only 80% of it is converted to the desired substance B and 20% to undesired by-products, so conversion of A is 90%, selectivity for B 80% and yield of substance B is 72% (=90%*80%). For copolymers conversion, selectivity and yield is calculated for each comonomer based on feed and incorporation into the product.

Hydrophobicity index is a measure of relative water repellency as described herein.

Kinematic viscosity of the copolymer products of the invention may be expressed in Cst @100° C. and is preferably measured in accordance with Test Method ASTM D 445.

Molecular weight herein is typically reported as number average molecular weight, Mn, in Daltons, and is measured by Gel permeation chromatography (GPC). GPC measurements reported herein were carried out using a Viscotek GPCmax® instrument (Malvern instruments, Worcestershire, UK) employing a 3-column set-up (5 µm (particle size) 100 Angstrom (pore size), 5 µm 500 Angstrom, 5 µm $10^4$ Angstrom) and a Refractive Index (RI) detector. Polyisobutylene standards were used to construct the calibration curve.

Polydispersity or PDI is defined as the ratio of the weight average molecular weight divided by the number average molecular weight of the polymer.

"Glass transition temperature" or Tg, of a composition refers to the temperature at which a composition transitions from a glassy state to a viscous or rubbery state. Glass transition temperature may be measured in accordance with ASTM D7426, ASTM D3418 or equivalent procedure as described herein.

"Melting temperature" refers to the crystalline melting temperature of a semi-crystalline composition. Melting temperatures may also be measured in accordance with ASTM D3418 or equivalent procedure.

Copolymers of the invention have significant amounts of alpha vinylidene terminated molecules due to the isobutylene content of the copolymers and their method of manufacture:

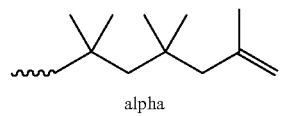

alpha

Reactive end groups present may also include beta olefin isomers (1,1,2-trisubstituted or 1,2,2-trisubstituted cis or trans isomer):

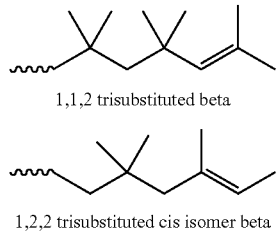

1,1,2 trisubstituted beta 1,2,2 trisubstituted cis isomer beta

Other end group structures which may be present include tetrasubstituted structures, other trisubstituted structures with a double bond in the internal gamma position, structures with other internal double bonds and aliphatic structures, for example:

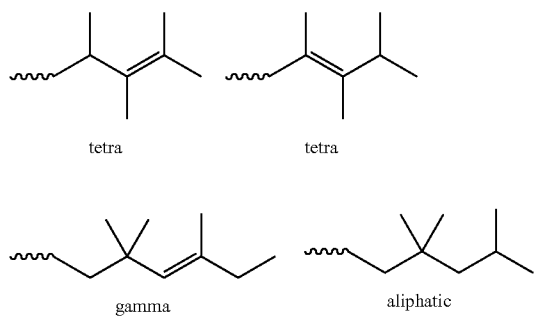

tetra    tetra gamma    aliphatic

The materials of the present invention may be characterized by double bond content based on monomer conversion or direct measurement by $^1$H NMR and $^{13}$C NMR as is seen in White, J. L. et al., Incorporation of Isoprene in Isobutylene/Isoprene Copolymers: NMR Identification of Branching in Butyl Rubber, Macromolecules 1995, 28, 3290-3300; Chu, C. Y. et al., Determination of the Structure of Butyl Rubber by NMR Spectroscopy, Macromolecules 1985, 18, 1423-1430; Barsan, F. et al., Polymerization of Isobutylene and the Copolymerization of Isobutylene and Isoprene Initiated by the Metallocene Derivative Cp*TiMe$_2$(μ-Me)B(C$_6$F$_5$)$_3$, Macromolecules, Vol. 31, No. 24, Dec. 1, 1998; and Tse, C. K. W., Isobutylene Polymerization and Isobutylene-Isoprene Copolymerization Using Cp*TiMe$_3$/B(C$_6$F$_5$)$_3$/Octadecanoic Acid Initiating System, (Thesis) Queens University Kingston Ontario, September 2001.

One sees different structures in the copolymer product, depending upon the comonomer species and the mechanism of addition of comonomer. For example, isobutylene/isoprene copolymer may have one of the following structures depending upon whether the addition of isoprene is a 1,4 or 1,2 or 4,3 addition to the copolymer chain:

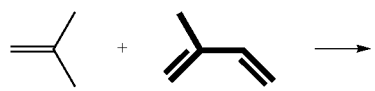

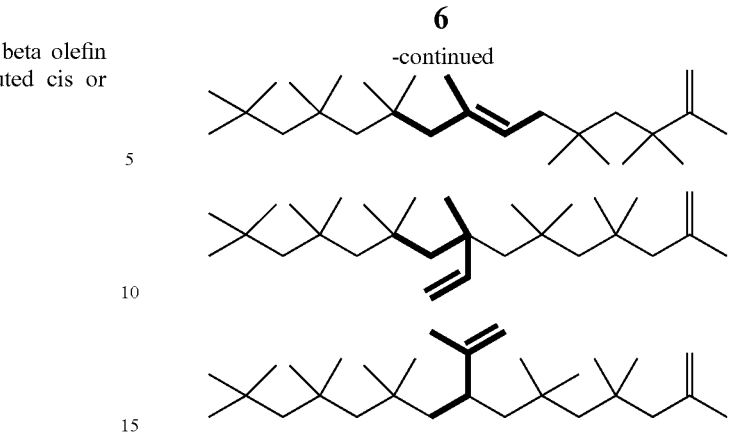

The molecules may have chain ends besides the alpha terminated chains seen above, including beta or tetra structures on the chain ends.

For present purposes, we refer to "vinylidine" double bonds as including alpha vinylidene double bonds and the internal vinylidine double bonds seen in the latter two structures above as well as the "internal alpha" structure referred to in U.S. Pat. No. 8,816,028, entitled Polyisobutylene Composition Having Internal Vinylidene and Process for Preparing the Polyisobutylene Polymer Composition:

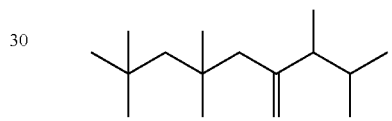

In general, "vinylidene" double bonds thus refer to reactive double bonds in the molecule that are CH$_2$ terminated.

In the examples which follow, the content of vinylidine double bonds was determined based on 1H-NMR spectroscopy in deuterated chloroform as the solvent. The olefinic methine hydrogens of the 1,4 isoprene give the triplet at 5.05 ppm. The olefinic methylene hydrogens from the isoprene show a doublet at 4.93 ppm. The peak at value 4.64 and 4.68 ppm is due to the formation of double bond at the endunit in the chain. Two major isobutyl signals at 1.14 ppm and 1.45 ppm are due to methyl and methylene protons of polyisobutylene units of the isobutylene-isoprene copolymer. Besides these signals there are other signals due to the presence of isoprenyl unit in the copolymer. These signals are reported in the literature noted above.

The improved process of the present invention features the use of Friedel-Crafts or Lewis acid catalysts which are typically complexed with a complexing agent. Many useful Lewis acid catalysts are known to those of ordinary skill in the related art field. In particular, many useful catalysts are described in the patents referenced above. Useful Lewis acid catalysts include, for example, BF$_3$, AlCl$_3$, TiCl$_4$, BCl$_3$, SnCl$_4$ and FeCl$_3$ and the like. The complexing agent for the catalyst, and in particular for the BF$_3$ catalyst, may be any compound containing a lone pair of electrons, such as, for example, an alcohol, an ester or an amine. The complexing agent may be an alcohol, desirably a primary alcohol, preferably a C1-C8 primary alcohol (such as, for example, methanol, ethanol, propanol, isopropanol, hexyl alcohol and the like) and ideally methanol. For purposes of convenience, "catalyst" refers to a Lewis acid catalyst of the class described above, while "catalyst complex" refers to the Lewis acid catalyst and complexing agent up to a 1:1 molar ratio. When complexing agent is used in a molar excess with respect to the Lewis acid catalyst it is referred to herein as modifier. Preferred Lewis acids which can be used are complexes of Aluminum trichloride and/or Ethyl Aluminum Dichloride with C1-C5 alcohol and/or ether as modifier.

The catalyst employed is most preferably a $BF_3$ catalyst together with a modifier, sometimes referred to as a cocatalyst or complexing agent. The modifier for the $BF_3$ catalyst may be any compound containing a lone pair of electrons, such as, for example, an alcohol, ether, an ester or an amine or mixtures thereof. The alcohol compound used as the cocatalyst may be a primary, secondary or tertiary alcohol having 1 to 8 carbon atoms, such as, for example, methanol, ethanol, isopropanol, n-propanol, isobutanol, t-butanol, hexyl alcohol and the like. The ether compound used as the cocatalyst may be a primary, secondary or tertiary ether having 2 to 8 carbon atoms, such as, for example, dimethyl ether, diethyl ether, diisopropyl ether, methylpropyl ether, methylisopropyl ether, methylethyl ether, methylbutyl ether, methyl-t-butyl ether, ethylpropyl ether, ethylisopropyl ether, ethylbutyl ether, ethylisobutyl ether, ethyl-t-butyl ether and the like. The complexing agent may be added to the reactor, in whole or in part, separately from the $BF_3$ catalyst, or pre-mixed therewith and added to the reactor together with the $BF_3$ catalyst. Likewise, modifier may be added to the reactor separately from the catalyst and complexing agent or pre-mixed therewith and added to the reactor together with the $BF_3$ catalyst and complexing agent.

In one embodiment, the polymerization reaction is carried out in the presence of a catalyst system comprising secondary alkylether, tertiary alcohol, and boron trifluoride, the amount of boron trifluoride is 0.05-1.0 weight part per 100 weight part of monomer, the mole ratio of a co-catalyst including secondary alkylether and tertiary alcohol:boron trifluoride is 1.0-2.0:1, and the mole ratio of secondary alkylether:tertiary alcohol is 0.5-1.2:1.

In many embodiments, the estimated molar ratio of modifier to $BF_3$ in the catalyst composition is generally in the range of from approximately 0.5-3.5 to 1, desirably within the range of from approximately 0.5:1 to approximately 2:1, and in some cases within the range of from approximately 1.5:1 to approximately 1:1. In some cases, the catalyst estimated composition may simply be a 1:1 molar complex of $BF_3$ and alcohol and ether mixtures. In other preferred embodiments of the invention, the estimated molar ratio of complexing agent:$BF_3$ in said complex may be approximately 1.3:1.

The temperature in the reaction zone may be maintained at a constant level at a temperature above −10° C. such as −7.5° C. or above or −5° C. or above; suitably 0° C. or above or wherein the reactor is maintained at a temperature of 5° C. or 10° C. or above. Temperatures in the range of above 10° C. to 27.5° C. are typical. The residence time is most preferably 45 minutes or less, such as 20 minutes or less, 15 minutes or less or 10 minutes or less. Suitable pressures may be anywhere from 2-20 bar to maintain a liquid phase.

In some embodiments, it is desirable to use one or more inert diluents such as an alkane (e.g., isobutane, n-butane, hexane and the like).

The products of the invention may be made in a continuous stirred tank reactor (CSTR), a plug flow reactor (PFR) or a loop reactor in a liquid phase process.

The flow characteristics of the reaction mixture are also influenced by temperature in the reactor, molecular weight, monomer and diluent content and so forth as is readily appreciated by one of skill in the art. The flow characteristics of the reaction mixture are thus controlled by feed and catalyst rates, conversion of monomer, mixture composition and the temperatures in the reactor as is seen in the examples which follow.

Typically, the inventive process is operated in a loop reactor wherein the recirculation rate is much higher than the feed rate; ratios of recirculation to feed ratios may be anywhere from 5:1 to 40:1.

Referring to FIG. 1, there is shown schematically a reactor system 10 which includes a two-pass loop reactor 12, a recirculation pump 14, a feed and recirculation loop indicated at 16, a product outlet indicated at 18 and a feed inlet indicated at 20. Reactor 12 includes a plurality of reaction tubes indicated at 22, 24 in a two-pass configuration within a heat exchanger shell indicated at 26.

In operation, isobutylene and comonomer feedstock, catalyst and modifier is continuously fed at 20 to the system, while pump 14 operates at a pressure differential to recirculate the reaction mixture in reactor 12 via loop 16, while product is continuously withdrawn at 18. Details of operating reactor 12 are provided in EP 1,242,464.

Instead of a homogeneous catalyst feed, a fixed bed loop reactor having generally the construction of FIG. 1 is provided with heterogeneous catalyst packed in the tubes of described heat exchanger. In such cases, a supported $BF_3$:alcohol catalyst is charged to the system as is seen in U.S. Pat. No. 8,791,216, entitled Activated Inorganic Metal Oxide and U.S. Pat. No. 8,816,028, entitled Polyisobutylene Composition Having Internal Vinylidene and Process for Preparing the Polyisobutylene Polymer Composition. Optionally, additional liquid catalyst complex is injected into the system to replenish the catalyst charge.

Figure 2:
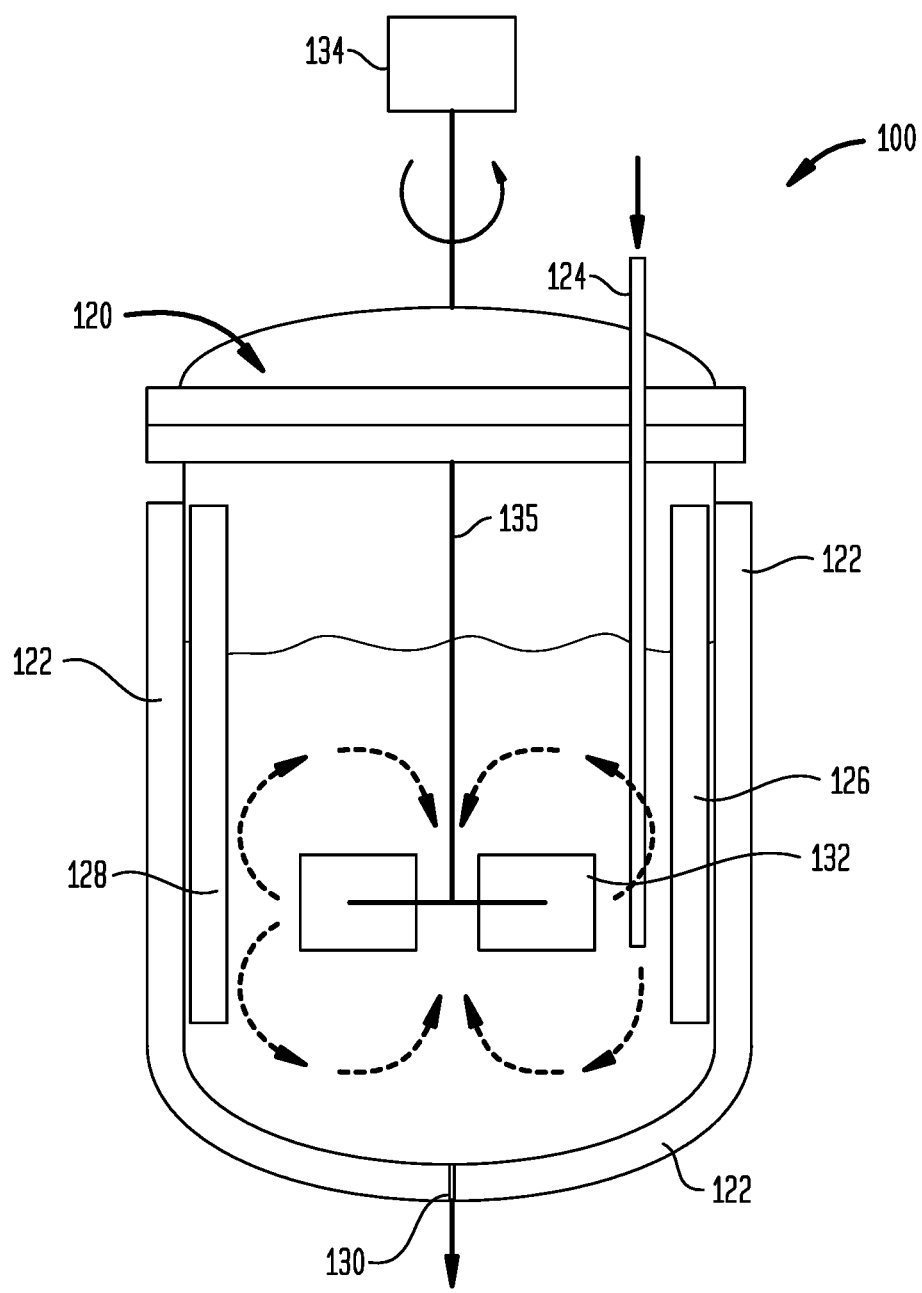
FIG. 2 is a schematic diagram illustrating a CSTR suitable for use in connection with the present invention.

In still another embodiment, the present invention is practiced in a CSTR, as shown schematically in FIG. 2. CSTR apparatus 100 includes a pressurized reaction vessel 120 provided with a cooling jacket 122, a feed port 124, one or more baffles 126, 128, an outlet port 130, as well as an agitator 132, driven by a motor 134 via shaft 135.

In operation, the isobutylene and comonomer feedstock, together with catalyst and modifier, is fed continuously to vessel 120 in the liquid phase through feed port 124, while motor 134 drives agitator 132 via shaft 135 to keep the reaction mixture thoroughly mixed. The feed rate, cooling jacket temperature and catalyst concentration are manipulated to keep the reactor at the desired temperature and to achieve target conversion as product is continuously withdrawn from outlet port 130 after a characteristic steady state residence time in the reactor.

The residence time, feed composition and temperature in all cases are important features towards achieving the desired properties in the copolymer product. Preferably, at least a relatively high temperature and/or a short residence time is employed.

Following withdrawal from the reactor, the reaction mixture is quenched to deactivate the catalyst, preferably with an inorganic base such as sodium hydroxide or ammonium containing catalyst deactivator such as ammonium hydroxide. The effluent is then washed with water to remove salts as described in U.S. Pat. No. 6,858,188. Following washing, the processed effluent is flashed or distilled to remove oligomers in order to provide a purified product as is discussed herein.

Suitably, after washing the product is heated to a temperature of 150° C. or above as part of the purification processes to further remove fluorides. Suitable treating temperatures may be from 150° C. to 300° C. or so, optionally at lower than atmospheric pressure (taking care not to overheat the polymer), to further remove quench salts while removing oligomers. A particularly preferred range is from 200° C. to 250° C. A suitable post-reactor purification methodology is illustrated in connection with FIG. 3.

Figure 3:
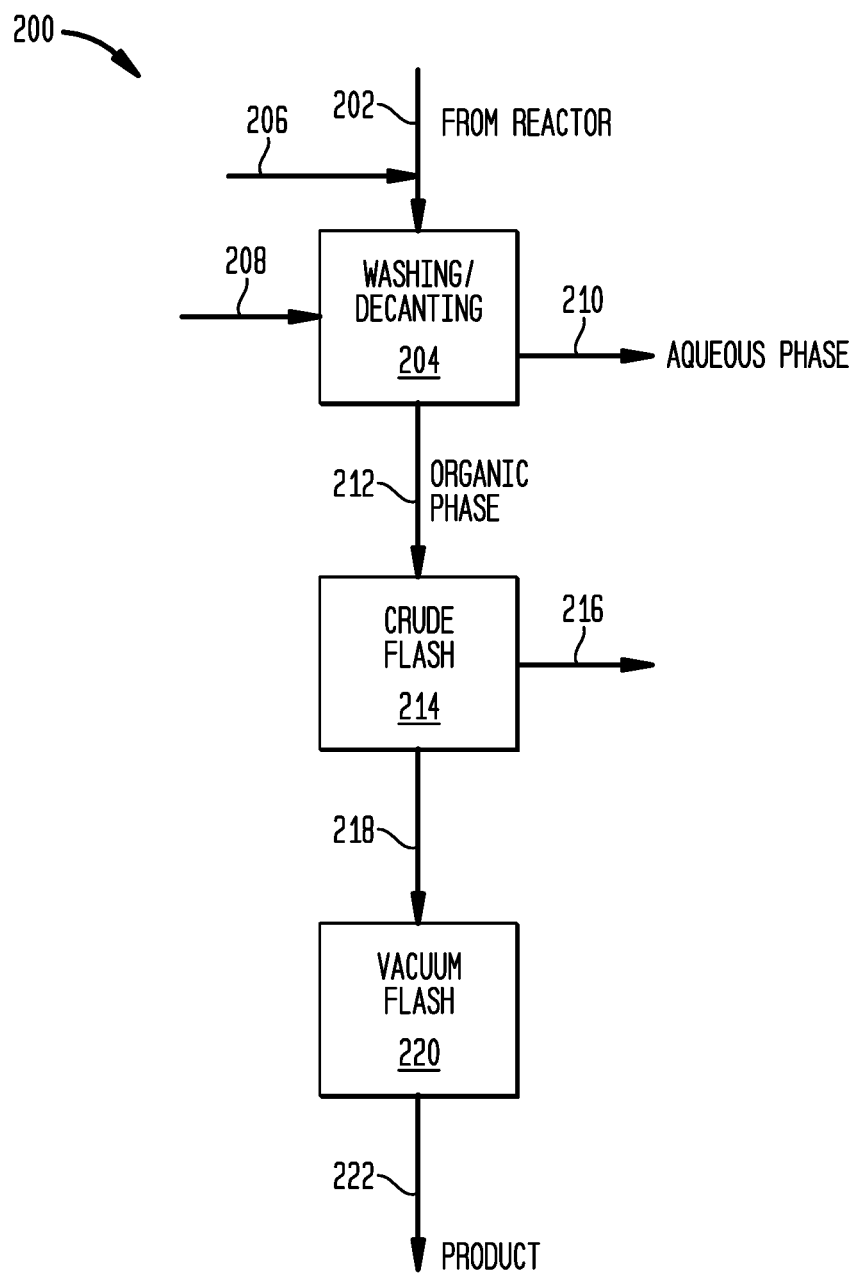
FIG. 3 is a block diagram illustrating a wash and distillation system for purifying isobutylene copolymer product.

In FIG. 3 there is illustrated schematically a process and apparatus 200 for purifying isobutylene copolymer produced in reactors such as reactors 12, 120 described above. The reactor outlet (for example, outlet 18 or outlet 130) feeds line 202 which is connected to a washing and decanting system 204. Line 206 provides a quenching agent such as aqueous ammonium hydroxide in excess of the amount needed to quench the catalyst. At 204, the quenched mixture is washed with water provided by way of line 208 and separated into two phases, an aqueous phase containing catalyst reside and ammonium hydroxide and a hydrocarbon phase containing polymer, unreacted monomer and solvents. The aqueous phase exits 204 via line 210 for further processing and recycle, while the organic phase exits 204 via line 212 and is heated and flashed at 214 under positive pressure at temperatures of 120-200° C. to remove monomer and light oligomers, usually up to C12 oligomers which exit via line 216 for further processing.

The partially purified isobutylene copolymer is forwarded via line 218 to a vacuum flash or distillation unit 220, where the product is further purified by distillation to remove oligomers, especially C8 to C24 oligomers at temperatures of from 150° C.-300° C. and pressures of from 0.25 psia to 10 psia or so. Alternatively, a wipe film evaporator or like apparatus can be employed to eliminate oligomers from the composition. The purified isobutylene copolymer product is removed at 222.

Examples 1-7

Using a loop reactor as in FIG. 1, polymerization was carried out by providing isobutylene, isoprene, along with $BF_3$ catalyst and a methanol co-catalyst to the circulation loop. Isobutylene and isoprene are dried on molecular sieves before use. The blended feedstock was fed to the reactor and polymerized in the liquid phase at the temperatures indicated in Table 1 below and an average residence time of less than 10 minutes; typically 4 minutes. Methanol/BF3 molar ratio was provided in the range of 0.5-2.0. After the completion of reaction, polymer was quenched with $NH_4OH$ and washed with water. Wash water was separated off and product was further purified by vacuum distillation. The purified product (IP-PIB) had isobutylene conversions by weight %, isoprene conversion by weight %, average number of double bond per polymer molecule between 1-5, molecular weight, Mn, in Daltons and a vinylidine double bond content per molecule as indicated in Table 1 below.

TABLE 1

PIB/Isoprene Copolymers

| Feature: | Product 1 | Product 2 | Product 3 | Product 4 | Product 5 | Product 6 | Product 7 |
|---|---|---|---|---|---|---|---|
| Isobutylene Content of feed (V %) | 88 | 88 | 85 | 85 | 80 | 80 | 65 |
| Isoprene (V %) | 2 | 2 | 5 | 5 | 10 | 10 | 25 |
| Isobutane (V %) | 10 | 10 | 10 | 10 | 10 | 10 | 10 |
| Reaction temp (F.) | 75 | 58 | 62 | 72 | 75 | 65 | 75 |
| Residence Time (Min) | <10 | <10 | <10 | <10 | <10 | <10 | <10 |
| alcohols:BF3 molar ratio | 1.0 | 1.7 | 1.0 | 1.7 | 1.0 | 1.7 | 1.0 |
| Conversion (iC4=) wt % |  | 71.3 | 61.6 | 80.8 | 87.6 | 85.0 | 72.2 |
| Conversion (iC5=) wt % |  | 56.8 | 52.5 | 68.7 | 75.6 | 75.1 | 61.2 |
| Mn (GPC) | 1050 | 1060 | 1050 | 583 | 600 | 600 | 600 |
| PDI | 1.93 | 1.9 | 2.2 | 1.54 | 1.52 | 1.41 | 1.48 |
| Average # of double bond/molecule * |  | 1.3 | 1.8 | 1.5 | 2.0 | 2.0 | 3.4 |
| Vinylidene double bond/molecule** |  | 0.83 | 0.83 | 0.81 | 0.98 | 1.25 | 1.7 |

* Based on conversion; average number of double bond per molecule is measured based on the conversion of isobutylene and isoprene; sample calculation below
**Determined by NMR Sample Calculation of Number of Double Bonds/Molecule from Conversion and Molecular Weight Data The number of double bonds per molecule in the foregoing Table is calculated from the conversion and molecular weight data as the average number of diene-derived units per molecule plus one. The average number of diene units is calculated by dividing the number average molecular weight, Mn, of the polymers by the molar average molecular weight of the repeat units incorporated into the copolymer and multiplying by the mole fraction isoprene units in the copolymer. Molar contents are calculated from the conversion data. Thus, for Product 7, the average number of double bonds per molecule is calculated as 2.4+1 or 3.4 using the foregoing data and densities of 0.681 and 0.588 for isoprene and isobutylene, respectively. For purposes of the calculation, molecular weights of 68 and 56 are used for isoprene and isobutylene. The average number of double bonds for Product 7 is thus calculated:

$$((600/((0.237*68)+(0.763*56)))*0.237)+1=3.4 \text{ double bonds/molecule}$$

Some preferred products of isobutylene/isoprene copolymers are enumerated in Table 1A below.

TABLE 1A

Representative Isobutylene-Isoprene Copolymers With High Double bond Content

| Feature | General Range | Typical Range | Preferred Range |
|---|---|---|---|
| Molecular Weight, Mn, Daltons | 250-2500 | 250-900 | 250-650 |
| Molar Ratio Isobutylene:Isoprene Derived Repeat Units | 30:1 to 3:1 | 12.5:1 to 3:1 | 5:1 to 3:1 |
| Double Bonds/Molecule | 1.25 to 5 | 1.3 to 4 | 3 to 4.5 |
| Vinylidene Bonds/Molecule | 0.8 to 3.5 | 0.85 to 2 | 1.2 to 1.8 |

The general, typical and preferred ranges for each feature in Table 1A can be interchanged for a specific embodiment, for Example a polymer of 2500 Daltons molecular weight may have the molar ratios and double bond features of the preferred ranges and so forth. Table 1A thus represents 81 specific combinations of ranges for molecular weight, molar ratios of isobutylene:isoprene derived repeat units, double bonds/molecule and vinylidene bonds/molecule for isobutylene-isoprene copolymers.

Comparative Example 1A

Utilizing a 40 mL reaction vial, 10% of isoprene was mixed with isobutylene and equilibrated a reaction mixture to −15° C. Subsequently, methanol/BF3 catalyst in a 1:1 molar ratio was added and the mixture reacted for 10 minutes, and then the polymer was quenched with NH₄OH and washed with water. The product was further purified by vacuum distillation to remove unreacted product volatiles. Purified product had isobutylene conversion of less than 55% with a number average molecular weight of Mn 1100. Despite a residence time of 10 minutes (more than twice the residence time of the loop reactor examples noted above) isobutylene conversions were less than about 55%.

Examples 8-10 for Synthesis of Polyisobutylene Styrene Copolymer

Using a loop reactor of the class described in connection with FIG. 1, polymerization was carried out by providing isobutylene, para-methyl styrene (pmStyrene), along with BF₃ catalyst and a methanol co-catalyst to the circulation loop. Isobutylene and isobutane are dried on molecular sieves before use. The blended feedstock was fed to the reactor and polymerized in the liquid phase at the temperatures indicated in the table below and an average residence time of less than 10 minutes; typically 4 minutes. Methanol/BF3 molar ratio was provided in the range of 0.5-2.0. After the completion of reaction, polymer was quenched with NH₄OH and washed with water. Wash water was separated off and product was further purified by a 2 stage flash separation. The purified product had isobutylene conversions by weight % and percentage incorporation of para methyl styrene in the polymer chain as indicated in Table 2 below.

TABLE 2

| PIB/Styrene Copolymers | | | |
|---|---|---|---|
| Feature: | Product 8 | Product 9 | Product 10 |
| Isobutylene Content of feed (V %) | 85 | 80 | 50 |
| pmStyrene (V %) | 5 | 10 | 50 |
| Isobutane (V %) | 10 | 10 | 10 |

TABLE 2-continued

| PIB/Styrene Copolymers | | | |
|---|---|---|---|
| Feature: | Product 8 | Product 9 | Product 10 |
| Reaction temp (F.) | 77 | 77 | 62 |
| Residence Time (Min) | <10 | <10 | <10 |
| alcohols:BF3 molar ratio | 1.0 | 1.0 | 1.0 |
| Conversion (iC4=) wt % | 61 | 40 | 5 |
| Mn (GPC) | 850 | 700 | 900 |
| PDI | 1.93 | 1.9 | 2.2 |
| Molar % of styrene/molecule | 11 | 22 | 90 |

In Examples 8-10 the percentage of para-methyl styrene incorporation in the polymeric chain was calculated based on proton NMR spectroscopy. For products 8-10, aromatic region peaks between 6.5-7.5 ppm are due to aromatic protons, whereas peaks between 0.1-5.7 are due to aliphatic protons. Based on the peak intensity of aromatic and aliphatic regions, % incorporation of styrene content in the polymeric chain is calculated. A detailed description of the analysis and calculation of the molar composition of the copolymers is reported in the literature, Journal of Macromolecular Science, Part A: Pure and Applied Chemistry, 32:11, 1809-1830 (1995).

It is seen in the data that the more reactive styrene is incorporated into the copolymer at much higher levels relative to isobutylene and pmStyrene in the feed at elevated temperatures.

The copolymers of the invention may be used to make a variety of derivatives for use in fuel or lubricant additives as well as rubber products, adhesives, sizings and resins such as unsaturated polyester resins or polyurethanes.

U.S. Pat. No. 5,663,457 to Kolp teaches to prepare alkylated hydroxyl aromatics by reacting polyisobutylene with hydroxyaromatics in the presence of an acidic ion exchange resin. This class of products is useful as lubricant and fuel additive compositions.

U.S. Pat. No. 5,725,612 to Malfer et al. discloses Mannich fuel additives prepared by reacting alkylated hydroxyaromatic compounds with an aliphatic polyamide and an aldehyde. Mannich reaction product fuel additives are also disclosed in United States Patent Application Publication No. US 2007/0068070 of Jackson et al. wherein the materials are prepared using a mixture of conventional and highly reactive polyisobutylene.

There is seen in United States Patent Application Publication No. US 2012/0000118 to Lange et al. low molecular weight polyisobutyl-substituted amines as dispersant boosters. Such compounds may be prepared by hydroformylating polyisobutylene followed by reductive amination as is well known in the art.

PIB-maleic anhydride reaction products such as polyisobutenylsuccinic anhydrides (PIBSAs) and polyisobutenylsuccinimides (PIBSIs) are also prepared with the copolymers of the invention:

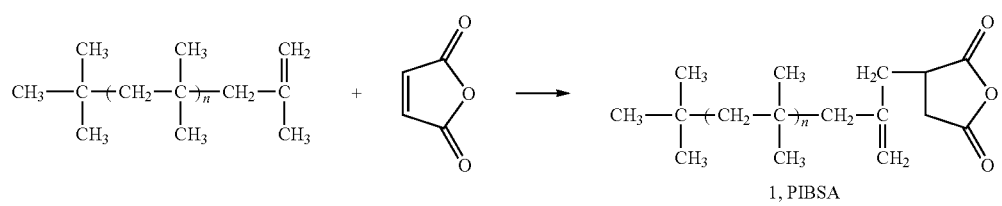

1, PIBSA

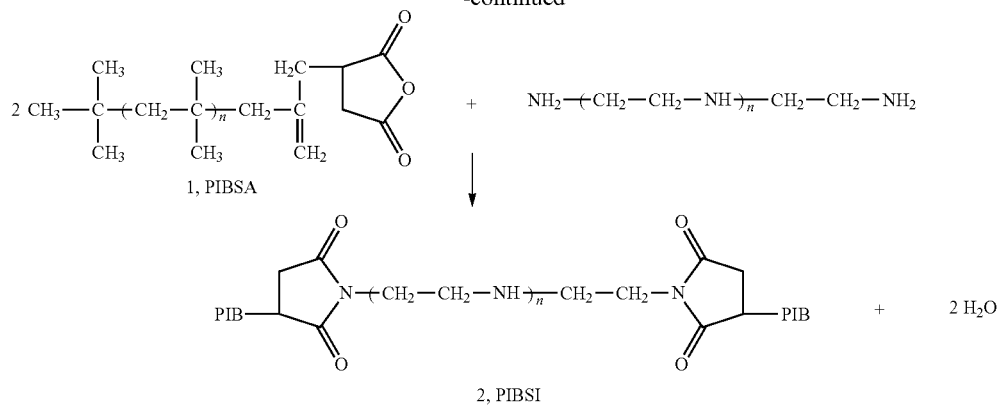

As is appreciated from the foregoing, Polyisobutylene Succinic anhydride (PIBSA) is often used as an intermediate for the synthesis of polyisobutylene succinimide (PIBSI). PIBSA derivatives are prepared via thermal ene reaction with maleic anhydride. It has been found in accordance with the invention that the multiple reactive double bonds in the polyisobutylene isoprene copolymer used to make IP-PIBSA with more than one maleic anhydride attached to the polyisobutylene isoprene copolymer molecule increases the polar to non-polar molecule ratio in the dispersant which has the unexpected and added advantage in dispersing property of the final molecule.

Product yield was more than 90%. Product made using polyisobutylene isoprene copolymer is higher in viscosity than the one prepared from polyisobutylene succinic anhydride. This is likely due to crosslinking of double bonds at higher temperature. Additional ratios of feed and suitable reaction conditions are noted in the following Table 3.

TABLE 3

Succinic Anhydride Synthesis

| Example | PIB:MA ratio Molar | Hold Temperature | Comments |
|---|---|---|---|
| 11 | 1:1 based on vinylidene in polymer | For 4 hrs @197 C. | 1:1 ratio of PIB:MA was added to preheated PIB. Reaction mixture was heated to 197 C. for 4 hrs and then temperature was increased to 210 C. for another 7 hrs. |
| 12 | 1:1 on based on vinylidene in polymer | For 4 hrs @197 C. | 1:1 ratio of PIB:MA was added to preheated PIB. Reaction mixture was heated to 197 C. and held for 4 hrs and then temperature was increased to 225 C. for another 7 hrs. Reactor pressure at 225 C. was 36.6 Psig |
| 13 | 1:1.4 based on vinylidene in polymer | Hold for 4 hrs @ 200 C. | 1:1.4 ratio of PIB:MA was added to preheated PIB. PIBSA sample was collected for analysis after 4 hrs at 200 C. Then reaction mixture was heated to 225 C. for 12 hrs. PIBSA sample was collected after 12 hrs. |
| 14 | 1:1.4 based on based on vinylidene in polymer | No hold | 1:1.4 ratio of PIB:MA was added to preheated PIB. PIBSA sample was collected for analysis after 4 hrs at 200 C. Then reaction mixture was heated to 225 C. for 12 hrs. PIBSA sample was collected after 16 hrs. |

Examples 11-14—Succinic Anhydride Synthesis

In a parr reactor, using product 7 as shown in Table 1, 1:3 molar ratio of product 7 and maleic anhydride was added at room temperature. The reaction mixture was stirred for 5 minutes and then heated to 210 degree Celsius for 12 hours to reaction completion. After, excess maleic anhydride was removed using vacuum and reaction product was collected.

Exemplary PIBSA and PIBSI compounds are enumerated in *Polyfunctional PIB Succinimide Type Engine Oil Additives*, L. Bartha et al., *Lubrication Science*, August, 2001, pp. 313-328. Amines may also be prepared from a carbonyl functionalized PIB as described in U.S. Pat. No. 5,124,484, Col. 2, lines 38-60. The various derivatives may thus be represented:

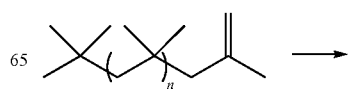

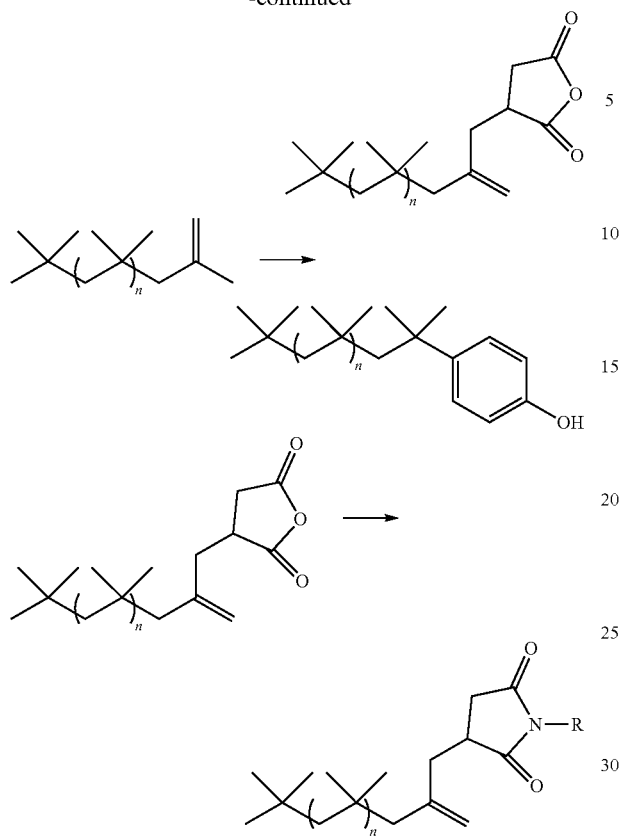

Additional copolymers and derivatives within the purview of the present invention include the following:

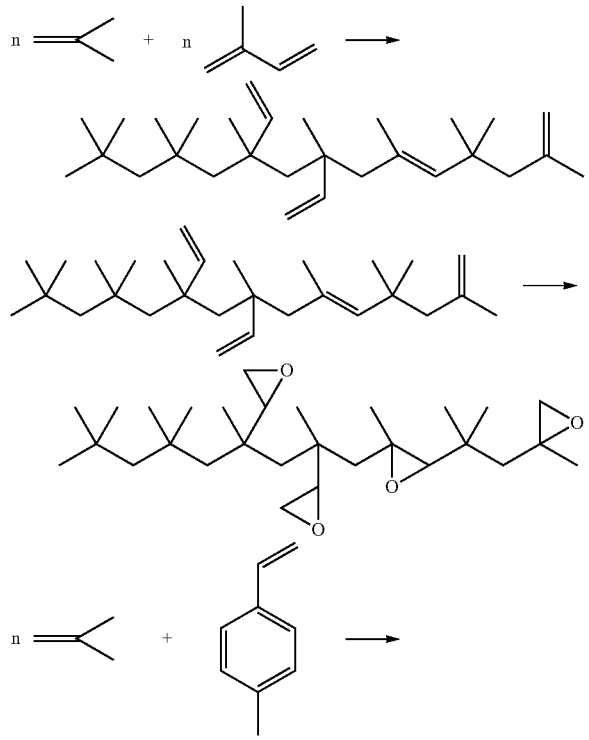

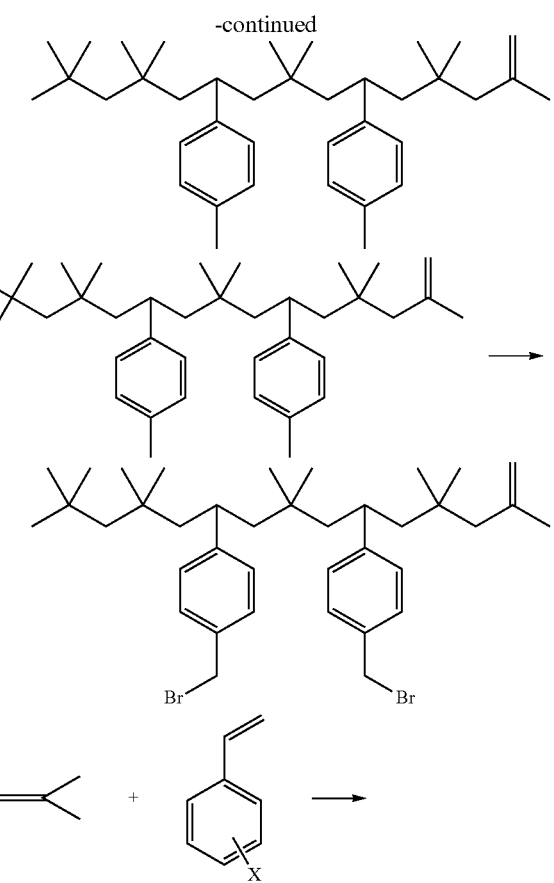

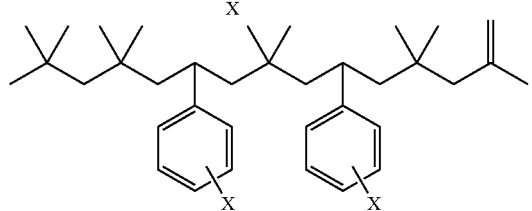

Adhesives are of numerous types, including chemically reactive, for example, epoxy type adhesives or thermoplastic adhesives such as hot melt adhesives or solvent based systems such as polyvinyl acetate emulsions. Pandit, R. et al., Epoxidation of Styrene/Butadiene Star Block Copolymer by Different Methods and Characterization of the Blends with Epoxy Resin, Macromol. Symp. 2014, 341, pp. 67-74 (Wiley, 2014) discloses various methods of epoxidating styrene/butadiene resins which are then blended with epoxy resins of the bisphenol-A type. The epoxidized resins are reported to make the blends more ductile. The reagents used to epoxidize the resins include m-chloroperoxy benzoic acid (MCPBA), peracetic aid (PAA), performic acid (PFA) and hexafluoro isopropanol (HFIP). Terpene resins have been disclosed for use in pressure-sensitive adhesives as tackifiers along with other resins and are reported to increase heat resistance of adhesives. Exemplary compositions might include 36% styrene-isoprene-styrene resin (SIS), 53% limonene resin, naphthenic oil and anti-oxidant.

The polyisobutylene/isoprene or other diene copolymers of the invention where many of the polymeric chains will have at least two double bonds is used as reactive plasticizer for adhesive formulations. Having multiple double bonds in the polymer chain facilitates crosslinking with pressure sensitive adhesives.

Paper sizing imparts hydrophobicity to paper which is generally very hydrophilic, thus allowing enhanced properties such as inking and water barrier properties. Paper sizing agents typically are of two classes, Alkyl Ketene Dimer (AKD) sizings or Alkyl Succinic Anhydride (ASA) sizings. ASA is typically an alpha olefin product in the range of 14-18 carbons prepared by reaction with maleic anhydride. ASA sizings are thus amphiphilic and reactive allowing integration into the paper via the succinic anhydride end and sizing properties are imparted by the hydrophobic hydrocarbon end. Thus, ASA is subsequently emulsified and added into the papermaking process either at the wet-end or sprayed on the paper web. The co-polymers described herein are expected to offer enhanced sizing properties based on multiple succinic anhydride groups per molecule allowing better integration into the paper product and superior sizing properties. Further details are seen in: Hodgson, K. T. A review of paper sizing using alkyl ketene dimer versus alkenyl succinic anhydride, Appita J. 47(1994):5. pp. 402-406; Gess, J. M. Rosin. The Sizing of Paper 3rd edition. Eds. Gess, J. M. & Rodriquez, J. M. Publ. TAPPI Press. Atlanta. 2005. pp. 57-73. A detailed discussion of paper sizing compositions, their preparation and use is also found in ASA Optimisation—Control of Particle Size, Stability and Hydrolysis, Martorana et al, University of Applied Sciences—München, Department of Paper Technology, Germany, Professional Papermaking 5 (2), pp. 34-42 (2008). U.S. Pat. Nos. 3,438,804 and 4,207,142 are of interest as well.

Examples 15-20—Paper Sizing

Samples of PM or co-polymer of isobutylene and 5 wt % isoprene were maleated using the thermal reaction of addition of maleic anhydride to the reactant at 210° C. for 18 hours. The standard sizing agent, dodecanyl succinic anhydride, a 12 carbon alkenyl succinic anhydride (ASA), was used as a control in all tests. To make the sizing emulsion using the anhydride sizing agents, 15 g of the alkylated succinic anhydride was combined with 185 g 4% starch solution and 1 or 0 ml emulsion stabilizing agent, Genapol 100, and the mixture was emulsified (blended) for 90 seconds.

No. 42 Whatman filter paper (unsized 6 samples per treatment group) was tared for untreated weight and then immersed into an emulsion prepared as noted above. Within 5 seconds the samples were removed, air dried overnight, and then oven dried (80° C.) for 4 hours. The samples were then weighed for uptake of solids from the emulsion. Details for Examples 15 to 20, referred to as Examples A-E and X, appear in Table 4 below.

TABLE 4

Sizing Compositions

| Sample | Description of components blended with starch | Abbrev. Name | Sizing Emulsion Uptake (g) | Water Uptake (g) |
| --- | --- | --- | --- | --- |
| PIBSA-450+ | PIB of MN 450 maleated, + Genapol | A | 0.201 | 0.98 |
| 5% IP-PIBSA+ | 5% isoprene random copolymer maleated, + Genapol | B | 0.196 | 0.36 |
| PIBSA-450− | PIB of MN 450 maleated, − Genapol | C | 0.118 | 0.57 |

TABLE 4-continued

Sizing Compositions

| Sample | Description of components blended with starch | Abbrev. Name | Sizing Emulsion Uptake (g) | Water Uptake (g) |
| --- | --- | --- | --- | --- |
| PIB-450+ | PIB of MN 450 non-maleated, + Genapol | D | 0.322 | 1.90 |
| ASA+ | Alkenyl Succinic Anhydride, + Genapol | E | 0.281 | 1.84 |
| Control | Untreated paper | X | 0.00 | 2.01 |

Figure 4:
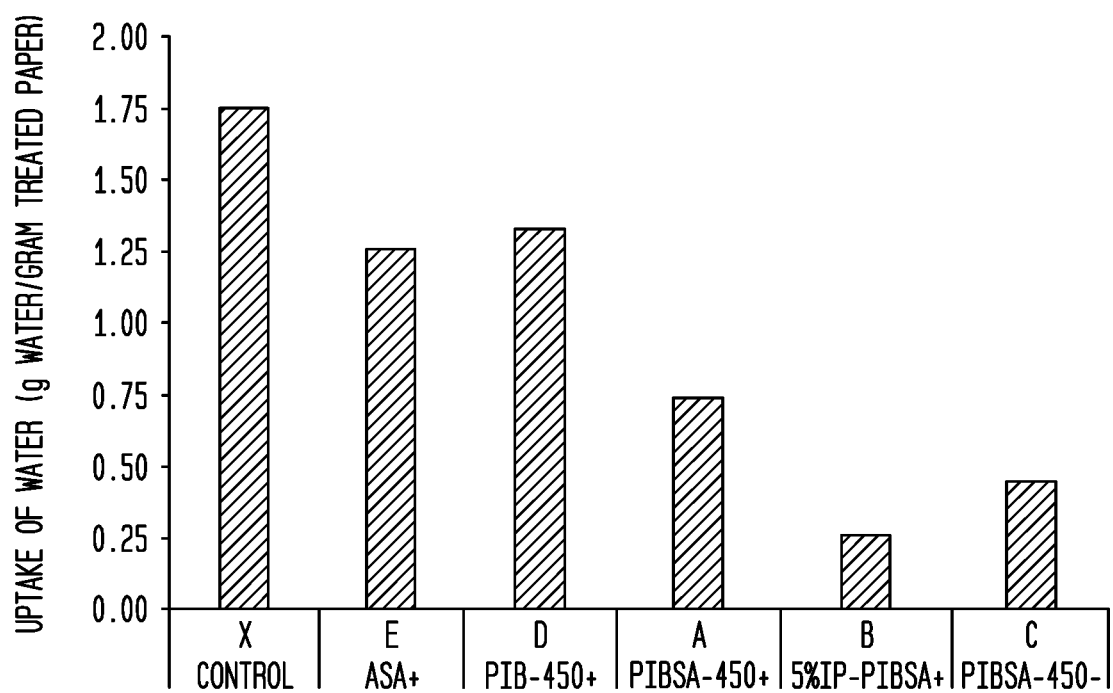
FIG. 4 is a histogram of water uptake of various untreated paper samples treated with sizing emulsions.

The degree of sizing Hydrophobicity Index, (HI) was determined using a modified Cobb Test as follows: the paper samples were immersed fully in water for 30 seconds, then blotted with a blotting towel (new each time), followed by rolling with a 1 Kg weight 5X, then weighed immediately to establish the amount of water uptake (n=5). Note that an untreated control was also used. Water uptake for the samples appears above in Table 4 and in FIG. 4 where water uptake is normalized to grams of treated paper.

A calculated Hydrophobicity Index takes into account the weight of sizing agent per gram of paper used in the test, which is then compared to ASA (ratio of the two) after first normalizing to untreated control. HI>1 means the sample is more hydrophobic than ASA treated. A sample calculation is set forth below:

All paper samples used were substantially the same size, thus equivalent in paper content and weight of paper need not be normalized in the calculation.

Terms:

$A$=(Grams of water uptake)$_{avg}$[g]=grams of water taken up by the treated sheets $A^*$=(Grams of water uptake)$_{ASA}$[g]=average grams of water taken up by the paper samples $B$=(Sizing Emulsion Uptake)$_{avg}$[g]=average grams of a sizing emulsion taken up by the paper samples $B^*$=(Sizing Emulsion Uptake)$_{ASA}$[g]=grams of a sizing emulsion taken up by the ASA treated sheets A dimensionless hydrophobicity index (HI) is thus calculated as:

$HI = 1 + [(A^*/B^*) - (A/B)]/(A/B)$ or:

$$HI = 1 + \frac{\frac{A^*}{B^*} - \frac{A}{B}}{\frac{A}{B}}$$

For Sample $E$, ASA: 1+[(1.84/0.281)−(1.84/0.281)]/(1.84/0.281)=1.00 or 100%

For Sample $B$: 1+[(1.84/0.281)−(0.36/0.196)]/(0.36/0.196)=3.56 or 356%

Figure 5:
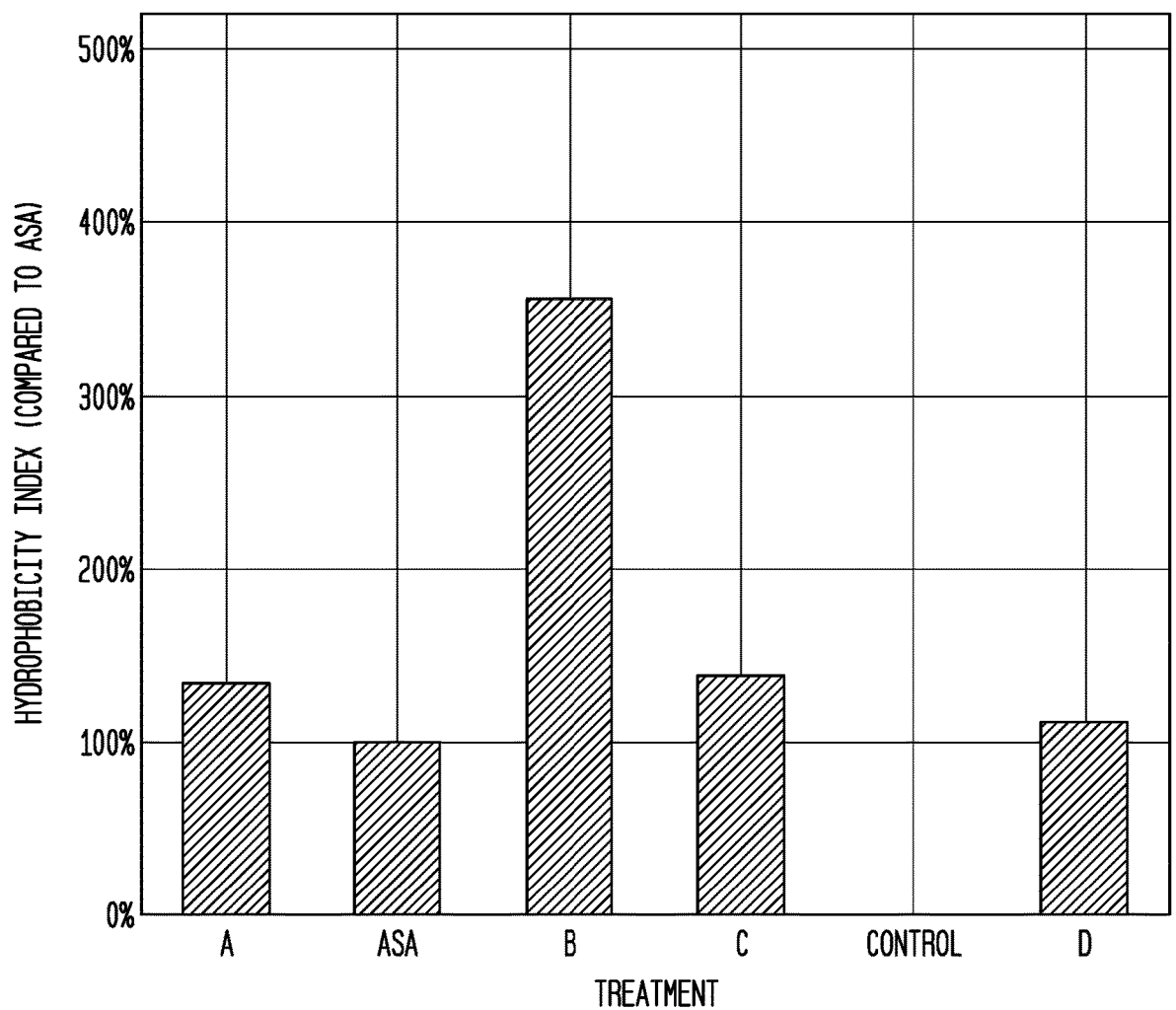
FIG. 5 is a histogram of Hydrophobicity Index of various samples of sized paper.

Results appear in FIG. 5.

The sample showing the greatest resistance to water uptake was the isoprene-isobutylene random co-polymer reacted with maleic anhydride (IP-PIBSA) with 3.5× or 350% higher hydrophobicity index than standard ASA. This is indeed a very useful and unexpected result. PIBSA, the homopolymer of PIB reacted with maleic anhydride with or without Genapol, showed similar hydrophobicity indices which were about 30% higher than ASA. The PM only, without the maleic anhydride reaction, showed hydrophobicity most similar to that of the ASA, showing that the succinic anhydride group on the PIB or the isoprene-PIB is preferred for bonding to the paper and thus hydrophobicity of the paper after sizing. The rank of sizing agents with increasing efficacy (hydrophobicity) is therefore:

ASA<PIBSA 450<<5% IP-PM SA

It is appreciated from the foregoing data that PIB-Isoprene copolymers are particularly preferred for preparing alkylated succinic anhydride sizing agents and emulsifying them with starch and optionally an additional emulsifier or protective colloid. Such compositions include a succinic anhydride derivative of a PIB-Isoprene copolymer having the features in the foregoing Table 1A, emulsified with starch and optionally including an additional emulsifier or protective colloid selected from one or more of: anionic surfactants such as an alkylbenzenesulfonate, an alkylsulfate, a rosined soap, a polyoxyethylene alkylphenyl ether sulfate, polyoxyethylene alkylphenyl ether sulfonate, polyoxyethylene alkylphenyl ether sulfosuccinate, a polyoxyethylene distyrylphenyl ether sulfate and a polyoxyethylene distyrylphenyl ether sulfosuccinate; nonionic surfactants such as polyethylene oxide, polypropylene oxide, and an alkyl, aryl, alkylaryl or aralkylaryl ester or partial ester, ether, or amide of polyethylene oxide or polypropylene oxide; cationic surfactants such as lauryltrimethylbenzylammonium chloride, stearyltrimethylbenzylammonium chloride, di stearyldimethylammonium chloride, alkylbenzyldimethylammonium chloride and alkylpyridinium chloride and the like as well as protective colloids, for instance, casein, lecithin, polyvinyl alcohol, a salt of styrene-maleic anhydride copolymer, a salt of styrene-acrylic acid copolymer, various kinds of modified starches, and the like. The various ranges of features in Table 1A may be combined with each other if so desired, for example the general range for molecular weight may be combined with typical ranges or preferred ranges for molar ratios of repeat units, double bonds per molecule and so forth as is noted above in connection with Table 1A.

The copolymers of the invention may also be used in connection with preparing various resinous products, including unsaturated polyester resins (UPR). These resins are mostly used with reinforced and non-reinforced material for a wide variety of applications. Fiberglass and other inorganic filler reinforced polyester resins are used in cars, boats, construction, fire retardant resins and in electronic devices. However, non-reinforced polyester resins are used in coating applications. Reinforced polyester resin has increased mechanical properties as compared to the non-reinforced one.

Polyester resins are synthesized by condensation reaction of anhydride or acid and alcohol based functional group. In general, maleic anhydride, phthallic anhydride and 1,2 propane glycol is used for condensation reaction. For fire retardant material, brominated or phosphate derivatives of phthallic anhydride is used. Synthesis of polyester resins using these molecules are mostly brittle in character. To reduce the brittleness and increase the hydrolytic stability of resins, we use polyisobutylene succinic anhydride (PIBSA) or polyisobutylene based copolymer derivatives in place of maleic anhydride to make polyester resins.

Synthesis Procedure for Unsaturated Polyester:

In a three neck round bottom flask polyisobutylene succinic anhydride (1 mol), phthallic anhydride (1 mol) and propylene glycol (2.1 mol) was added. Mixture was heated to 200° C. with continuous stirring for 12 hrs. After the completion of condensation reaction, temperature was reduced to 150° C. and 200 mg of hydroquinone was added in the polyester resin and diluted with 25-40 wt % of styrene. Usually, methyl ethyl ketone or benzoyl peroxide is used as initiator to cure the polymer. The polyester resins and the styrene solvents react together to crosslink and form the solid resins. Polyester resins are formulated with inorganic filler for various applications.

Maleic Anhydride or (PIBSA)+phthallic anhydride+ 1,3 propane glycol→Polyester:

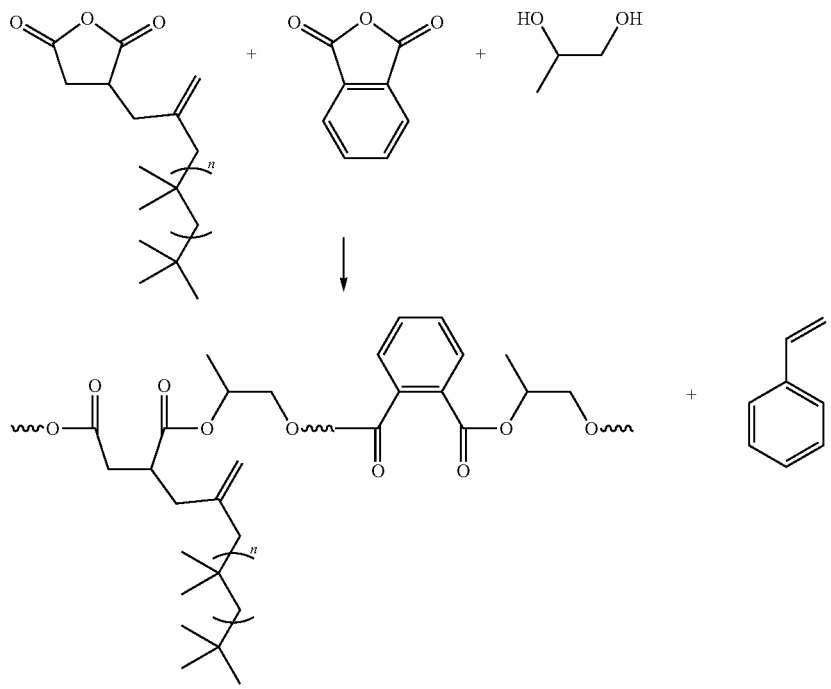

Polyester+Styrene yields the polyester/styrene resins. See Bharat Dholakiya (2012). Unsaturated Polyester Resin for Specialty Applications, Polyester, Dr. Hosam El-Din Saleh (Ed.), InTech, DOI: 10.5772/48479. Available from: https://www.intechopen.com/books/polyester/unsaturated-polyester-resin-for-specialty-applications, as of Aug. 2, 2017 (Chapter 7). See also U.S. Pat. No. 4,698,411.

Examples 21-28 for Synthesizing Unsaturated Polyesters

The following polyester resins are readily prepared by way of the above procedure:

TABLE 5

Unsaturated Polyester Compositions

| Example | Maleic Anhydride | PIBSA (450) | PIB-IPSA (450) | PTHA | 1,3 propane glycol | Polystyrene (30% by wt.) |
| --- | --- | --- | --- | --- | --- | --- |
| 21 | yes | No | No | yes | yes | yes |
| 22 | yes | yes | No | No | yes | yes |
| 23 | 50% | 50% | No | yes | yes | yes |
| 24 | No | Yes | No | Yes | yes | yes |
| 25 | 50% | No | 50% | yes | yes | yes |
| 26 | 50% | No | 50% | No | yes | yes |
| 27 | Yes | No | Yes | No | yes | yes |
| 28 | yes | No | Yes | yes | yes | yes |

In the above Table, PIBSA (450) refers to isobutylene homopolymer based anhydride and PIB-IPSA (450) refers to isobutylene/isoprene copolymer based anhydride, wherein the molecular weight of the copolymer, Mn, is 450 Daltons. It will be appreciated from the foregoing that an unsaturated polyester resin may be synthesized to incorporate a low molecular weight polyisobutylene homopolymer or oligomer having a number average molecular weight, Mn, of less than 800 Daltons, suitably 750 Daltons or less. This is conveniently provided by incorporating succinic anhydrides of oligomers such as triisobutylene or tetraisobutylene during preparation of the resins.

There is thus provided in accordance with the present invention an improvement in unsaturated polyester resin production comprising preparing a succinic anhydride from a polyisobutylene composition and synthesizing the unsaturated polyester resin by reacting the succinic anhydride with a glycol and a diacid or diacid anhydride, wherein the polyisobutylene composition is selected from (i) low molecular weight polyisobutylene homopolymer or oligomer having a molecular weight of less than 800 Daltons, suitably from 200 to 800 Daltons, or an isobutylene copolymer having a molecular weight of less than 800 Daltons, suitably from 200 to 800 Daltons, or (ii) a polyisobutylene copolymer of isobutylene and one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene wherein the molar ratio of isobutylene derived repeat units to the comonomer derived repeat units is from 75:1 to 1.5:1 and the isobutylene copolymer has a molecular weight, Mn, of from 200 to 20,000 Daltons. The isobutylene copolymer composition may have any of the features noted herein, including without limitation, one or more of the features listed in Table 7 below.

Examples 29-31 for Crosslinking Unsaturated Polyesters

To an unsaturated polyester of maleic anhydride, phthalic anhydride, and 1,3 propylene glycol of the class of Example 21 (with styrene), 10 weight % of polyisobutylene isoprene copolymer (Mn-450), 0.2% of cobalt naphthenate, 1-2% of MEKP and 0.5% of diethyl aniline was added and mixed to make a homogenous solution at room temperature. Subsequently, the resin mixture was cured in an oven at 90 degree celsius overnight. A similar experiment was performed with polyisobutylene para-methyl styrene copolymer (Mn~450). It was found that cured resin with added polyisobutylene isoprene copolymer or polyisobutylene para-methyl styrene copolymer had better mechanical properties (such as izod impact, flexural strength and shrinkage property of resins) than those without added polyisobutylene copolymer. Similar results are seen with low molecular weight PIB copolymer.

To an unsaturated polyester of maleic anhydride, phthalic anhydride, and 1,3 propylene glycol utilized in Example 29, 10 weight % of polyisobutylene homopolymer (Mn~450), 0.2% of cobalt napthenate, 1-2% of MEKP and 0.5% of diethyl aniline was added and mixed to make a homogenous solution at room temperature. Subsequently, the resin mixture was cured in an oven at 90 degrees Celsius overnight. A similar experiment was performed with and without addition of polyisobutylene (Mn~450). It was found that cured resin with added polyisobutylene had better mechanical properties (Izod impact, flexural strength and shrinkage of the resins) than the one without added polyisobutylene.

In another experiment, when more than 10% of polyisobutylene copolymer was used, it led to separation of two layers during curing. Polyisobutylene or polyisobutylene copolymer is preferably employed at relatively low levels, wherein the PIB polymer also acts as a plasticizer in the resins. Depending upon the solubility of the PM polymer or PIB copolymer in the medium, the amount of PIB polymer or copolymer employed in an unsaturated polyester resin may be higher or lower considering the solubility of the PIB polymer or PM copolymer; typically in the range of from 5% to 20% of the solids present.

There is thus provided in another aspect of the present invention an improvement in curing unsaturated polyester resin compositions comprising providing an unsaturated polyester resin composition, adding a polyisobutylene composition along with an initiator and optionally one or more copromoters followed by curing the unsaturated polyester composition. The initiator is suitably a peroxide compound such as methyl ethyl ketone peroxide, and the copromoters (accelerators) may be a metal complex such as a metal napthenate or octoate, or an organic compound such as diethyl aniline, N,N dimethylacetoacetamide, or acetoacetanilide. Suitable components are enumerated in Kirk Othmer Encyclopedia of Chemical Technology, Vol. 18, pp. 575-586. See also U.S. Pat. No. 3,288,735, EP 1342739 and a product brochure from Eastman Chemicals entitled "Eastman copromoters for effective polyester cure" (2016). The polyisobutylene composition is selected from (i) low molecular weight polyisobutylene homopolymer or oligomer having a molecular weight of less than 800 Daltons, suitably from 200 to 800 Daltons, or an isobutylene copolymer having a molecular weight of less than 800 Daltons, suitably from 200 to 800 Daltons, or (ii) a polyisobutylene copolymer of isobutylene and one or more comonomers selected from one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene wherein the molar ratio of isobutylene derived repeat units to the comonomer derived repeat units is from 75:1 to 1.5:1 and the isobutylene copolymer has a molecular weight, Mn, of from 200 to 20,000 Daltons. The isobutylene copolymer composition may have any of the features noted herein, including without limitation, one or more of the features listed in Table 7 below.

Polyisobutylene copolymer based epoxy derivatives are also used for epoxy resins. These may be prepared by way of reacting the copolymers of the invention with a peroxidizing agent in order to provide epoxidized copolymers in accordance with the following:

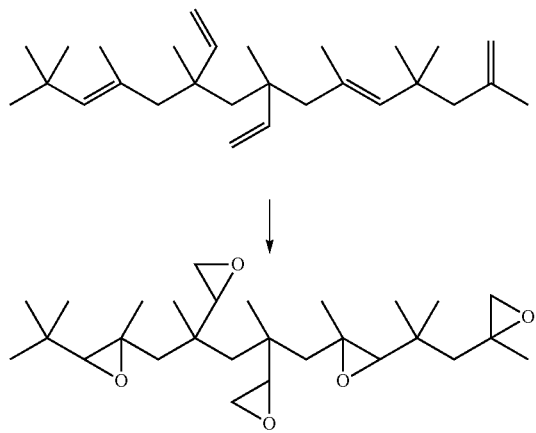

See U.S. Pat. No. 7,388,033 to Nagy et al. and the references noted above for details.

Polyisobutylene or PIB based copolymers may be functionalized with OH groups and reacted with di or polyisocyanates to make polyurethanes. See Magenau, Andrew Jackson David, "Polyisobutylene Chain End Transformations: Block Copolymer Synthesis and Click Chemistry Functionalizations" (2010). Dissertations. 872. http://aquila.usm.edu/dissertations/872. See also, U.S. Pat. No. 8,710,147 to Cherpeck et al.

The copolymers of the invention are likewise suitable to improve properties of rubber compositions, such as those comprising butyl rubber, styrene-butadiene rubber (SBR), natural rubber and the like. The copolymers may be used as such or more preferably derivatized to phenolic, succinimide or succinic anhydride form to provide further functionality and compatibility with the rubber composition. Typically, the copolymers of the invention are used in amounts of from about 2 to 25 percent by weight of copolymer or copolymer derivative based on the combined weight of the rubber and copolymer or copolymer derivative in the composition. The copolymers of the invention may be used as reactive intermediates that are part of the rubber matrix production process by grafting onto the rubber matrix resin or copolymerizing with the rubber monomers during production of the rubber resin, thereby modifying the mechanical or physical properties of the rubber itself. The copolymers of the invention may also be compounded into the rubber in connection with curing to improve the mechanical or physical properties, and may be used as a replacement or enhancement for the typically used process (asphalt) oils during cure. Similarly, the copolymers of the invention may be applied after curing a rubber product and reacted with the cured product to improve properties of the product, for example frictional properties.

Due to increased functionality, viscosity and so forth, the copolymers of the invention further improve the properties of a rubber product as compared to conventional rubber/polyisobutylene based compositions as are seen in U.S. Pat. No. 4,465,829 to Graves and U.S. Pat. No. 9,752,020 to Wang et al. The copolymers of the invention can be tailored to the application. For example, a random or non-random isobutylene/styrene copolymer optionally derivatized to phenolic, succinimide or succinic anhydride form provides a better anchor in the matrix of an SBR system than PIB or other PIB copolymer compositions. So also, the diene copolymers of the invention are especially useful when used in connection with curing of the rubber product; here again the diene copolymers may be derivatized to phenolic, succinimide or succinic anhydride form.

Embodiments of the Invention

There is provided in accordance with the present invention a method of making an isobutylene copolymer comprising: (a) providing a reaction mixture to a reactor comprising isobutylene monomer, and one or more comonomers selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene as well as a Lewis acid polymerization catalyst, wherein the molar ratio of isobutylene monomer to the comonomer is from 60:1 to 1:1; (b) polymerizing the reaction mixture while maintaining the reactor at a temperature above −30° C. and utilizing a reactor residence time of less than 45 minutes to produce a crude isobutylene copolymer in a polymerization mixture; and (c) recovering a purified isobutylene copolymer from the polymerization mixture having a molecular weight, Mn of from 200 to 20,000 Daltons. Suitable temperatures and residence times which may be selected for the process appear in the following Table 6:

TABLE 6

| Reaction Conditions | | |
|---|---|---|
| | Reactor Temperature | Residence Time |
| General | −30° C. to 35° C. | 45 minutes or less |
| Preferred | −20° C. to 35° C. | 20 minutes or less |
| | −10° C. to 35° C. | 15 minutes or less |
| | −5° C. to 35° C. | 10 minutes or less |
| | 0° C. to 35° C. | 2 to 8 minutes |
| | 5° C. to 35° C. | |
| | 10° C. to 35° C. | |
| | 15° C. to 35° C. | |
| | 20° C. to 35° C. | |
| | 25° C. to 35° C. | |

The conversion of isobutylene monomer is suitably from 40% to 98%, more preferably from 50% to 95% or 55% to 90%, while the conversion of comonomer is suitably from 30% to 90%, more preferably from 40% to 85% or from 45% to 80%

Polymerization is typically carried out in a loop reactor or in a CSTR. The Lewis Acid polymerization catalyst typically comprises a catalyst including $BF_3$, $AlCl_3$ or $EtAlCl_2$ and a co-catalyst comprising an alcohol, ether or ester or mixture thereof, most preferably the catalyst comprises $BF_3$ and an alcohol co-catalyst.

Molar ratios of isobutylene to the one or more comonomers is generally from 30:1 to 1:1, more typically the molar ratio of isobutylene to the one or more comonomers is from 12:1 to 1:1 or from 6:1 to 1:1. In some preferred embodiments, the molar ratio of isobutylene to the one or more comonomers is from 3:5 to 1:1. The one or more comonomers may consist essentially of isoprene, or alpha methyl styrene or mixtures thereof, or may consist essentially of butadiene, cyclopentadiene, dicyclopentadiene, limonene, piperylene or mixtures thereof.

The purified copolymer products of the invention have the features indicated in the Table 7 below.

TABLE 7

Product Attributes

| | General | Preferred |
|---|---|---|
| Molecular Weight, Mn Daltons | 250-10,000 | 250-3,000 |
| | | 250-1,500 |
| | | 250-900 |
| | | 250-700 |
| Double Bonds/Molecule | 1.25-5 | 1.75-3.5 |
| | 1.3-4 | 3-4.5 |
| Vinylidene Bonds/Molecule | 0.8-3.5 | 0.85-2 |
| | | 1.2-1.8 |
| PDI | 1.2-4 | 1.4-2.5 |

In another aspect of the invention, there is provided an isobutylene copolymer comprising repeat units derived from isobutylene and repeat units derived from one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene wherein the molar ratio of isobutylene derived repeat units to the comonomer derived repeat units is from 75:1 to 1.5:1 and the isobutylene copolymer has a molecular weight, Mn, of from 200 to 20,000 Daltons. The product may have any of the features noted above and the additional features noted below.

The molar ratio of isobutylene derived repeat units to the comonomer derived repeat units is generally from 70:1 to 2:1, more preferably from 30:1 to 3:1 or from 12.5:1 to 3:1. In some embodiments, the molar ratio of isobutylene derived repeat units to the comonomer derived repeat units is from 5:1 to 3:1. Most preferably, the isobutylene copolymer is substantially chloride-free.

The isobutylene copolymer according to the invention may be incorporated into an adhesive composition, a sizing composition, an unsaturated polyester resin, a fuel or lube additive composition, an epoxy resin or a polyurethane resin. It has also been found that an unsaturated polyester resin incorporating low molecular weight polyisobutylene having a number average molecular weight, Mn, of less than 800 Daltons especially wherein the polyester resin incorporates a succinic anhydride derivative of a low molecular weight polyisobutylene oligomer selected from triisobutylene and tetraisobutylene.

Among the preferred embodiments of the invention are the following 51 embodiments. Embodiment No. 1 which is a method of making an isobutylene copolymer comprising: (a) providing a reaction mixture to a reactor comprising isobutylene monomer, and one or more comonomers selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene as well as a Lewis acid polymerization catalyst, wherein the molar ratio of isobutylene monomer to the comonomer is from 60:1 to 1:1;
(b) polymerizing the reaction mixture while maintaining the reactor at a temperature above −30° C. and utilizing a reactor residence time of less than 45 minutes to produce a crude isobutylene copolymer in a polymerization mixture; and
(c) recovering a purified isobutylene copolymer from the polymerization mixture having a molecular weight, Mn, of from 200 to 20,000 Daltons,
with the provisos that (i) when the comonomer is isoprene, butadiene or mixtures thereof, the reactor temperature is maintained at 0° C. or above and the purified isobutylene copolymer has a molecular weight, Mn, of from 200 to 2500 Daltons and (ii) when the comonomer comprises a substituted styrene the purified copolymer has a molecular weight, Mn, of from 200 to 5000 Daltons.

Embodiment No. 2 is the method according to Embodiment No. 1, wherein the reactor is maintained at a temperature of up to 35° C.

Embodiment No. 3 is the method according to Embodiment No. 2, wherein the reactor is maintained at a temperature of 5° C. or above.

Embodiment No. 4 is the method according to Embodiment No. 3, wherein the reactor is maintained at a temperature of 10° C. or above.

Embodiment No. 5 is the method according to Embodiment No. 4, wherein the reactor is maintained at a temperature of 15° C. or above.

Embodiment No. 6 is the method of Embodiment No. 5, wherein the reactor is maintained at a temperature of 20° C. or above.

Embodiment No. 7 is the method according to Embodiment No. 1, utilizing a reactor residence time of 20 minutes or less.

Embodiment No. 8 is the method according to Embodiment No. 7, utilizing a reactor residence time of 10 minutes or less.

Embodiment No. 9 is the method according to Embodiment No. 1, wherein the conversion of isobutylene monomer is from 55% to 90%.

Embodiment No. 10 is the method according to Embodiment No. 1, wherein the conversion of comonomer is from 45% to 80%.

Embodiment No. 11 is the method according to Embodiment No. 1, wherein polymerization is carried out in a loop reactor.

Embodiment No. 12 is the method according to Embodiment No. 1, wherein polymerization is carried out in a CSTR.

Embodiment No. 13 is the method according to Embodiment No. 1, wherein the polymerization catalyst comprises $BF_3$ and an alcohol co-catalyst.

Embodiment No. 14 is the method according to Embodiment No. 1, wherein the molar ratio of isobutylene to the one or more comonomers is from 12:1 to 1:1.

Embodiment No. 15 is the method according to Embodiment No. 1, wherein the molar ratio of isobutylene to the one or more comonomers is from 3:5 to 1:1.

Embodiment No. 16 is the method according to Embodiment No. 1, wherein the one or more comonomers comprise isoprene.

Embodiment No. 17 is the method according to Embodiment No. 1, wherein the one or more comonomers comprise alpha methyl styrene or para methyl styrene.

Embodiment No. 18 is the method according to Embodiment No. 1, wherein the purified isobutylene copolymer has a molecular weight, Mn, of from 250 to 1,500 Daltons.

Embodiment No. 19 is the method according to Embodiment No. 18, wherein the purified isobutylene copolymer has a molecular weight, Mn, of from 250 to 700 Daltons.

Embodiment No. 20 is the method according to Embodiment No. 1, wherein the purified isobutylene copolymer has, on average, from 1.25 to 5 double bonds per molecule.

Embodiment No. 21 is the method according to Embodiment No. 1, wherein the purified isobutylene copolymer has, on average, from 0.8 to 2 vinylidene double bonds per molecule.

Embodiment No. 22 is the method according to Embodiment No. 21, wherein the purified isobutylene copolymer has, on average, from 1.2 to 1.8 vinylidene double bonds per molecule.

Embodiment No. 23 is the method according to Embodiment No. 1, wherein the purified isobutylene copolymer has a PDI of from 1.2 to 4.

Embodiment No. 24 is the method according to any of Embodiment Nos. 1-23, further comprising incorporating the copolymer into an adhesive composition.

Embodiment No. 25 is the method according to any of Embodiment Nos. 1-23, further comprising incorporating the copolymer into a sizing composition.

Embodiment No. 26 is the method according to any of Embodiment Nos. 1-23, further comprising incorporating the copolymer into an unsaturated polyester resin.

Embodiment No. 27 is the method according to any of Embodiment Nos. 1-23, further comprising incorporating the copolymer into a fuel or lube additive composition.

Embodiment No. 28 is the method according to any of Embodiment Nos. 1-23, further comprising incorporating the copolymer into an epoxy resin.

Embodiment No. 29 is the method according to any of Embodiment Nos. 1-23, further comprising incorporating the copolymer into a polyurethane resin.

Embodiment No. 30 is the method according to any of Embodiment Nos. 1-23, further comprising incorporating the copolymer into a rubber composition.

Embodiment No. 31 is an isobutylene copolymer comprising repeat units derived from isobutylene and repeat units derived from one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene wherein the molar ratio of isobutylene derived repeat units to the comonomer derived repeat units is from 75:1 to 1.5:1 and the isobutylene copolymer has a molecular weight, Mn, of from 200 to 20,000 Daltons, with the provisos that (i) when the comonomer comprises a substituted styrene, the copolymer has a molecular weight, Mn, from 200 to 5000 Daltons and (ii)) when the comonomer is isoprene, butadiene or mixtures thereof, the copolymer has a molecular weight, Mn, of from 200 to 2500 Daltons, at least 1.3 double bonds per molecule and greater than 0.8 vinylidene double bonds per molecule.

Embodiment No. 32 is the isobutylene copolymer according to Embodiment No. 31, wherein the molar ratio of isobutylene derived repeat units to the comonomer derived repeat units is from 30:1 to 3:1.

Embodiment No. 33 is the isobutylene copolymer according to Embodiment No. 32, wherein the molar ratio of isobutylene derived repeat units to the comonomer derived repeat units is from 12.5:1 to 3:1.

Embodiment No. 34 is the isobutylene copolymer according to Embodiment No. 33, wherein the molar ratio of isobutylene derived repeat units to the comonomer derived repeat units is from 5:1 to 3:1.

Embodiment No. 35 is the isobutylene copolymer according to Embodiment No. 31, wherein the isobutylene copolymer has a molecular weight, Mn, of from 250 to 1,500 Daltons.

Embodiment No. 36 is the isobutylene copolymer according to Embodiment No. 35, wherein the isobutylene copolymer has a molecular weight, Mn, of from 250 to 900 Daltons.

Embodiment No. 37 is the isobutylene copolymer according to Embodiment No. 36, wherein the isobutylene copolymer has a molecular weight, Mn, of from 250 to 700 Daltons.

Embodiment No. 38 is the isobutylene copolymer according to any one of Embodiment Nos. 31-37, wherein the isobutylene copolymer has a PDI of from 1.2 to 4.

Embodiment No. 39 is the isobutylene copolymer according to Embodiment No. 31, wherein the one or more comonomers comprise alpha methyl styrene or para methyl styrene.

Embodiment No. 40 is the isobutylene copolymer according to Embodiment No. 31, wherein the one or more comonomers comprise isoprene.

Embodiment No. 41 is the isobutylene copolymer according to Embodiment No. 31, wherein the one or more comonomers comprise a monomer selected from cyclopentadiene, dicyclopentadiene, butadiene, limonene or piperylene.

Embodiment No. 42 is the isobutylene copolymer according to Embodiment Nos. 40 or 41, wherein the isobutylene copolymer has, on average, from 1.25 to 5 double bonds per molecule.

Embodiment No. 43 is the isobutylene copolymer according to Embodiment Nos. 40 or 41, wherein the isobutylene copolymer has, on average, from 1.3 to 4 double bonds per molecule.

Embodiment No. 44 is the isobutylene copolymer according to Embodiment Nos. 40 or 41, wherein the isobutylene copolymer has, on average, from 3 to 4.5 double bonds per molecule.

Embodiment No. 45 is the isobutylene copolymer according to Embodiment Nos. 40 or 41, wherein the isobutylene copolymer has, on average, from 0.8 to 3.5 vinylidene double bonds per molecule.

Embodiment No. 46 is the isobutylene copolymer according to claim 40 or 41, wherein the isobutylene copolymer has, on average, from 0.85 to 2 vinylidene double bonds per molecule.

Embodiment No. 47 is the isobutylene copolymer according to Embodiment Nos. 40 or 41, wherein the isobutylene copolymer has, on average, from 1.2 to 1.8 vinylidene double bonds per molecule.

Embodiment No. 48 is an unsaturated polyester resin incorporating low molecular weight polyisobutylene having a number average molecular weight, Mn, of less than 800 Daltons.

Embodiment No. 49 is the unsaturated polyester resin according to Embodiment No. 48, wherein the polyester resin incorporates a succinic anhydride derivative of a low molecular weight polyisobutylene oligomer selected from triisobutylene and tetraisobutylene.

Embodiment No. 50 is the unsaturated polyester resin according to Embodiment No. 48, wherein the polyisobutylene is incorporated in an amount of less than 10% by weight of the composition.

Embodiment No. 51 is the unsaturated polyester resin according to Embodiment No. 50, wherein the low molecular weight polyisobutylene is a copolymer of isobutylene and one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene wherein the molar ratio of isobutylene derived repeat units to the comonomer derived repeat units is from 75:1 to 1.5:1 and the isobutylene copolymer has a molecular weight, Mn, of from 200 to 20,000 Daltons, with the provisos that (i) when the comonomer is styrene, the copolymer has a molecular weight, Mn, from 200 to 500 Daltons and (ii)) when the comonomer is isoprene or butadiene the copolymer has a molecular weight, Mn, of from 200 to 2500 Daltons, at least 1.3 double bonds per molecule and greater than 0.8 vinylidene double bonds per molecule.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of illustration only and is not intended to limit the invention.

What is claimed is:

1. A method of making and using an isobutylene copolymer comprising:
   (a) providing a reaction mixture to a reactor comprising isobutylene monomer, and one or more comonomers selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene as well as a Lewis acid polymerization catalyst,
   wherein the molar ratio of isobutylene monomer to the comonomer is from 60:1 to 1:1;
   (b) polymerizing the reaction mixture while maintaining the reactor at a temperature above −30° C. and utilizing a reactor residence time of less than 45 minutes to produce a crude isobutylene copolymer in a polymerization mixture; and
   (c) recovering a purified isobutylene copolymer from the polymerization mixture having a molecular weight, Mn, of from 200 to 20,000 Daltons,
   with the provisos that (i) when the comonomer is isoprene, butadiene or mixtures thereof, the reactor temperature is maintained at 0° C. or above and the purified isobutylene copolymer has a molecular weight, Mn, of from 200 to 2500 Daltons and (ii) when the comonomer comprises a substituted styrene the purified copolymer has a molecular weight, Mn, of from 200 to 5000 Daltons,
   said method further comprising: (i) incorporating the copolymer into a sizing composition; (ii) incorporating the copolymer into an unsaturated polyester resin; (iii) incorporating the copolymer into an epoxy resin or (iv) incorporating the copolymer into a polyurethane resin.

2. The method according to claim 1, wherein the reactor is maintained at a temperature of up to 35° C.

3. The method according to claim 2, wherein the reactor is maintained at a temperature of 5° C. or above.

4. The method according to claim 3, wherein the reactor is maintained at a temperature of 10° C. or above.

5. The method according to claim 1, utilizing a reactor residence time of 20 minutes or less.

6. The method according to claim 5, utilizing a reactor residence time of 10 minutes or less.

7. The method according to claim 1, wherein the conversion of comonomer is from 45% to 80%.

8. The method according to claim 1, wherein polymerization is carried out in a loop reactor.

9. The method according to claim 1, wherein the molar ratio of isobutylene to the one or more comonomers is from 3:5 to 1:1.

10. The method according to claim 1, comprising incorporating the copolymer into a sizing composition.

11. The method according to claim 1, comprising incorporating the copolymer into an unsaturated polyester resin.

12. The method according to claim 1, comprising incorporating the copolymer into an epoxy resin.

13. The method according to claim 1, comprising incorporating the copolymer into a polyurethane resin.

14. A composition including a composition comprising repeat units derived from isobutylene and repeat units derived from one or more comonomers selected from isoprene, butadiene, cyclopentadiene, dicyclopentadiene, limonene, substituted styrenes, piperylene and C4 to C10 dienes other than isoprene, butadiene, limonene, cyclopentadiene or dicyclopentadiene wherein the molar ratio of isobutylene derived repeat units to the comonomer derived repeat units is from 75:1 to 1.5:1 and the isobutylene copolymer has a molecular weight, Mn, of from 200 to 20,000 Daltons, with the provisos that (i) when the comonomer comprises a substituted styrene, the copolymer has a molecular weight, Mn, from 200 to 5000 Daltons and (ii) when the comonomer is isoprene, butadiene or mixtures thereof, the copolymer has a molecular weight, Mn, of from 200 to 2500 Daltons, at least 1.3 double bonds per molecule and greater than 0.8 vinylidene double bonds per molecule, wherein said isobutylene copolymer is incorporated into (i) a sizing composition; (ii) an unsaturated polyester resin; (iii) an epoxy resin or (iv) a polyurethane resin.

15. The isobutylene copolymer according to claim 14, wherein the isobutylene copolymer has a molecular weight, Mn, of from 250 to 1,500 Daltons.

16. An isobutylene copolymer comprising repeat units derived from isobutylene and repeat units derived from isoprene comonomer, wherein the molar ratio of isobutylene derived repeat units to the isoprene comonomer derived repeat units is from 75:1 to 1.5:1 and the isobutylene copolymer has a molecular weight, Mn, of from 200 to 2500 Daltons, at least 1.3 double bonds per molecule and greater than 0.8 vinylidene double bonds per molecule.

17. The isobutylene copolymer according to claim 16, wherein the isobutylene copolymer has, on average, from 1.3 to 4 double bonds per molecule.

18. The isobutylene copolymer according to claim 16, wherein the isobutylene copolymer has, on average, from 0.85 to 2 vinylidene double bonds per molecule.

19. The isobutylene copolymer according to claim 16, wherein the isobutylene copolymer has, on average, from 1.2 to 1.8 vinylidene double bonds per molecule.

20. The isobutylene copolymer according to claim 16, wherein the isobutylene copolymer has, on average, from 3 to 4.5 double bonds per molecule.

21. A method of making an isobutylene copolymer comprising:
(a) providing a reaction mixture to a reactor comprising isobutylene monomer, and one or more comonomers selected from isoprene, butadiene, cyclopentadiene, dicyclopentadiene, limonene, substituted styrenes, piperylene and C4 to C10 dienes other than isoprene, butadiene, cyclopentadiene, dicyclopentadiene, limonene or piperylene as well as a Lewis acid polymerization catalyst,
wherein the molar ratio of isobutylene monomer to the comonomer is from 12:1 to 1:1;
(b) polymerizing the reaction mixture while maintaining the reactor at a temperature of 0° C. to 35° C. and utilizing a reactor residence time of less than 20 minutes to produce a crude isobutylene copolymer in a polymerization mixture; and
(c) recovering a purified isobutylene copolymer from the polymerization mixture having a molecular weight, Mn, of from 200 to 20,000 Daltons,
with the provisos that (i) when the comonomer is isoprene, butadiene or mixtures thereof, the purified isobutylene copolymer has a molecular weight, Mn, of from 200 to 2500 Daltons, as well as from 1.2 to 1.8 vinylidene double bonds per molecule and (ii) when the comonomer comprises a substituted styrene, the Lewis acid polymerization catalyst is boron trifluoride and the purified copolymer has a molecular weight, Mn, of from 250 to 1500 Daltons.

22. The method according to claim 21, utilizing a reactor residence time of 10 minutes or less.

23. The method according to claim 21, wherein the conversion of comonomer is from 45% to 80%.

24. The method according to claim 21, wherein polymerization is carried out in a loop reactor.

25. The method according to claim 21, wherein the molar ratio of isobutylene to the one or more comonomers is from 3:5 to 1:1.

* * * * *